US012632016B2

(12) United States Patent
    Qiao et al.

(10) Patent No.:   US 12,632,016 B2
(45) Date of Patent:    *May 19, 2026

(54) SYSTEM AND METHOD FOR DATA-DRIVEN CONTROL OF AN AIR-CONDITIONING SYSTEM

(71) Applicant: Mitsubishi Electric Research Laboratories, Inc., Cambridge, MA (US)

(72) Inventors: Hongtao Qiao, Cambridge, MA (US); Chandrachur Bhattacharya, Cambridge, MA (US); Ankush Chakrabarty, Cambridge, MA (US); Christopher Laughman, Waltham, MA (US); Yebin Wang, Cambridge, MA (US); Huazhen Fang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 537 days.

This patent is subject to a terminal disclaimer.

(21) Appl. No.: 18/116,867

(22) Filed: Mar. 3, 2023

(65) Prior Publication Data

US 2024/0111261 A1      Apr. 4, 2024

Related U.S. Application Data

(60) Provisional application No. 63/412,757, filed on Oct. 3, 2022.

(51) Int. Cl.
    *G05B 13/04*       (2006.01)
    *F24F 11/64*       (2018.01)
    (Continued)

(52) U.S. Cl.
    CPC ............ *G05B 13/041* (2013.01); *F24F 11/64* (2018.01); *F24F 11/81* (2018.01); *G05B 13/027* (2013.01);
    (Continued)

(58) Field of Classification Search
    CPC ......... F24F 11/64; F24F 11/81; G05B 13/027; G05B 13/041; G05B 17/02; G05B 19/042; G05B 2219/2614
    See application file for complete search history.

(56) References Cited

U.S. PATENT DOCUMENTS

2017/0350625 A1*  12/2017  Burns ..................... F25B 49/02
2018/0259978 A1*   9/2018  Dweik .................. G16H 30/40
(Continued)

*Primary Examiner* — Tameem D Siddiquee
(74) *Attorney, Agent, or Firm* — Gene Vinokur

(57)            ABSTRACT

A system for controlling an operation of an air-conditioning system including a heat exchanger is provided. The system comprises a processor that executes a neural network trained to simulate an operation of the heat exchanger for a test control input, to produce an output of the simulation based on historical data defining a state of the heat exchanger. The historical data includes a sequence of historical control inputs provided to the heat exchanger and a sequence of historical outputs of the operation of the heat exchanger corresponding to the sequence of historical control inputs. The processor determines a control command to the air-conditioning system based on the predicted test output of the simulation of the operation of the heat exchanger for the test control input and transmits the determined control command to an actuator of the air-conditioning system.

18 Claims, 14 Drawing Sheets

(51) Int. Cl.
    *F24F 11/81*        (2018.01)
    *G05B 13/02*      (2006.01)
    *G05B 19/042*    (2006.01)

(52) U.S. Cl.
    CPC .... *G05B 19/042* (2013.01); *G05B 2219/2614*
                                     (2013.01)

(56)                 References Cited

U.S. PATENT DOCUMENTS

| | | | |
|---|---|---|---|
| 2019/0236446 A1 | 8/2019 | Qin | |
| 2020/0201313 A1* | 6/2020 | Kludt | G06N 5/04 |
| 2021/0035551 A1* | 2/2021 | Stanton | G10L 13/04 |
| 2021/0191348 A1 | 6/2021 | Lee et al. | |
| 2023/0116964 A1* | 4/2023 | Sun | F24F 11/39 |
| | | | 700/276 |
| 2023/0314031 A1* | 10/2023 | Mostafavi | F24F 11/62 |
| | | | 700/277 |
| 2023/0315079 A1* | 10/2023 | Risbeck | G05B 23/0254 |

* cited by examiner

300B

310

Obtain a trajectory of data by execution of physics-based heat exchanger model with the boundary conditions on the refrigerant and air states as the inputs

312

Use machine learning algorithm to train the heat exchanger model

314

Output data driven model with air and refrigerant states

300C

316 Generate one or more datasets associated with the trajectory of data

318 Compute a mean-squared error

320 Compute and optimize a training loss

700A

702 Generate various test control inputs

704 Transmit test control inputs to the model

706 Assess each test control input based on model output, test control input, and reference 708 Select the test control input that optimizes the cost function 902
Determine the control command to the air-conditioning system 904
Transmit the control command to an actuator of the air-conditioning system

900

SYSTEM AND METHOD FOR DATA-DRIVEN CONTROL OF AN AIR-CONDITIONING SYSTEM

TECHNICAL FIELD

The present disclosure relates generally to control systems, and more particularly to a control system and a method for data-driven control of air-conditioners including a heat exchanger.

BACKGROUND

Control theory in control systems engineering is a subfield of mathematics that deals with control of continuously operating dynamical systems in engineered processes and machines. Control systems aim to perform control operations for dynamical systems using a control action, to ensure control stability.

For example, optimization-based control and estimation techniques, such as model predictive control (MPC), allow a model-based design framework in which the system dynamics and constraints may directly be considered. The MPC is used in many applications to control dynamical systems of various complexities. Examples of such systems include production lines, car engines, robots, numerically controlled machining, satellites, and power generators. However, in certain situations, an analytical model of a controlled system may be unavailable, difficult to update in real-time, or inaccurate. Examples of such cases are prevalent in the field of robotics, heating, ventilating, and air conditioning (HVAC) system, vehicles, smart grids, factory automation, transportation, self-tuning machines, and traffic networks.

For example, heat exchangers are widely used to transfer heat between air and working fluids in refrigeration, comfort cooling, and heating applications, and play a dominant role in the performance of heating, ventilating, air conditioning, and refrigeration (HVAC&R) equipment. However, the design and optimization of heat exchangers may be challenging due to a large number of design variables, complex manufacturing constraints, and multiple conflicting objectives.

In general, the dynamics of heat exchangers may be described by the laws of conservation, i.e., balances of mass, energy, and momentum. In the physics-based modeling approach, to predict a heat transfer and fluid flow dynamics that occur in the heat exchanger, resulting differential algebraic equations (DAEs) may need to be solved. However, a DAE system may be quite difficult to solve, and the challenges may arise from index reduction, consistent initialization, and intrinsic stiffness. Moreover, the model complexity (the number of equations) increases significantly for large-size heat exchangers with complex circuitries. Since temporal dynamics of the HVAC systems may often be dominated by those of the heat exchangers, simulation-based equipment design processes and other applications of predictive models are limited by the computational complexity of the heat exchanger models.

In an absence of accurate models of the dynamical systems, some control methods exploit operational data generated by these systems in order to construct feedback control policies that stabilize the system dynamics or embed quantifiable control-relevant performance. The use of operational data for the control is called data-driven control. Typically, there may be two kinds of data-driven control methods, such as an indirect method and a direct method. In the indirect method, first a model of the system is constructed and then the model is leveraged to design controllers. However, in the direct method, control policies from the operational data are directly constructed without the intermediate model-building step. A drawback of the indirect methods is a potential requirement of large quantities of data in the model-building phase. Conversely, the direct methods require fewer data. However, even cutting-edge direct control methods experience difficulties in handling state and input constraints that are imperative for maintaining safe operation in closed-loop control systems.

Accordingly, there is a need for indirect data-driven methods to control one or multiple heat exchangers with a reduced amount of data for model construction.

SUMMARY

The present disclosure provides a control system and a method for controlling an operation of an air-conditioning system including a heat exchanger. The proposed control system and the method may be utilized to generate a control policy for controlling dynamical behavior of the air-conditioning system including at least one heat exchanger using a control action in an optimum manner without delay or overshoot and ensuring control stability of the air-conditioning system.

It is an object of some embodiments to provide the control system and the method for data-driven control of the air-conditioning system including the heat exchanger. Additionally or alternatively, it is an object of some embodiments to provide the control system and the method for indirect data-driven control with a neural network model derived from a practical and predetermined window of historical data of operation of the heat exchanger.

Some embodiments are based on the realization that the dynamics of the heat exchanger may be replaced with a digital twin simulating an operation of the heat exchanger outputting variables that the model (such as the neural network model) of the heat exchanger needs to estimate. The simulation of the operation of the heat exchanger by the digital twin model enables reduction in historical data as compared to a conventional indirect data-driven model of the heat exchanger.

Some embodiments are based on the recognition that conventional analytical model for the air-conditioning system including the heat exchanger is based on physical law of conservation and requires complex differential algebraic equation (DAE) that is often difficult to solve. Further, the increased number and size of heat exchangers in the air-conditioning system leads to rise in complexities of the DAEs.

Some embodiments are based on the realization that a neural network, such as a convolutional recurrent network speeds up the simulation of nonlinear dynamics of heat exchangers. To that end, a deep state-space modeling framework that combines feature extraction capabilities of a convolutional neural networks (CNNs) with the sequence prediction properties of a gated recurrent units (GRUs) is constructed. This modeling framework describes fluid flow and heat transfer dynamics of the heat exchangers in vapor compression cycles that are used in building energy systems.

Different from modeling based on the physical laws of conservation, the proposed modeling approach develops relationships between input data and output data without explicit knowledge of underlying behavior and does not involve any DAEs. Further, the number of model equations generated by the proposed modeling approach is independent on the geometry, size, circuitry pattern, and operating conditions of the heat exchangers. Therefore, the resulting model is efficient to solve in real-time making it effective for online control of any air-conditioning system including the heat exchanger.

To that end, some embodiments disclose a neural network having a combination of convolutional and recurrent networks. The neural network is trained to simulate an operation of the heat exchanger for a test control input to produce an output of the simulation based on historical data defining a state of the heat exchanger. The historical data includes a sequence of historical control inputs to the heat exchanger and a sequence of historical outputs of the operation of the heat exchanger corresponding to the sequence of historical control inputs.

The neural network includes a first arm processing the boundary input appended to the sequence of historical boundary inputs with a first combination of convolutional and recurrent networks trained to extract features indicative of variation of the boundary input from the historical boundary inputs. The neural network further includes a second arm processing the sequence of historical boundary inputs paired with the sequence of historical outputs with a second combination of convolutional and recurrent networks trained to extract output features indicative of dynamical coupling between inputs and output of the operation of the heat exchanger. The neural network further includes a third arm processing the control features and the output features to predict a test output of the operation of the heat exchanger corresponding to the boundary input.

Some embodiments disclose that each of the first arm and the second arm of the neural network includes a bank of one-dimensional convolutional layers (such as a CNN) followed by a gated recurrent unit (GRU). In such a manner, CNN-GRU leverages the concept of one-dimensional (1-D) convolutional networks for a first-stage analysis of the time-series data. This allows better temporal feature extraction from the inputs/outputs. The GRUs are efficient recurrent neural cells that analyze the extracted temporal features to learn the system dynamics. Further, splitting of the data into the input time series (analyzed by the first arm) and the corresponding output (analyzed by the second arm) allows the neural network to individually learn effect of predicted outputs from variations in the inputs and the coupling of the inputs and outputs in the dynamical system.

Some embodiments are based on the realization that the third arm may be implemented as a fully connected deep neural network accepting a tensor including the control and output features. The purpose of the fully connected deep neural network layer is to project the augmented GRU states to an output space.

Accordingly, the first arm analyses the input time series, and the second arm analyses the historical system output. Thus, the neural network is made aware of the immediately previous inputs and the corresponding output allowing it to understand the current state of the heat exchanger and/or the air-conditioning system. Armed with the knowledge of the system dynamics, the current system state, and the next input, the neural network may accurately predict the output for the next time-step.

Some embodiments disclose the control system having a controller that determines a control command to the actuator of the air-conditioning system on the basis of the predicted output of the system model. The control command may be transmitted to the air-conditioning system for changing a speed of a compressor, an opening or closing of a valve, or changing a speed of a fan of the machine, and the like.

Some embodiments are based on the realization that a path of the first arm and a path of the second arm are assigned with different neural weights. The different neural weights may be assigned for an enhanced accuracy of the neural network.

Some embodiments are based on the realization that the neural network may be trained by a trajectory of data that is generated by running a physics-based model of the heat exchanger with one or more boundary conditions associated with the heat exchanger. During training of the neural network, the trajectory of data is divided in a plurality of batches. Each batch comprises at least one of the sequence of historical control inputs, the sequence of historical outputs, a first input to the machine, and a true output of the machine. Processing a predefined window of data in the batch rather than entire trajectory of data reduces backpropagation time in the training of GRUs. Further, avoiding the requirement of learning from the entire time-series at once and instead employing batches allows for scalability in the face of large datasets, parallelizability, and improves storage efficiency.

Some embodiments disclose that a mean-squared error may be computed for each batch of the plurality of batches on the basis of a predicted output of the heat exchanger neural network model and the true output of the air-conditioning system. Further, a training loss associated with the computed mean-squared error for each batch is determined and optimized.

Some embodiments disclose that at each time-step of the simulation, a model of the air-conditioning system including a room model, a compressor model, an expansion model and the neural network model of the heat exchangers is initialized. Further, the boundary conditions on the air side of the air-conditioning system and the settings of the compressor and expansion device may be determined. Then, the model of the air-conditioning system along with the room model are executed on a basis of these conditions. One or more states including refrigerant state, or an air state associated with the room model and the plurality of component models are generated. Processing each component model rather than a single model for the whole machine allows reduction in requirement of data for prediction of the output data. Further, processing a data-driven model having similar neural network architecture for each heat exchanger is convenient in controlling dynamic behavior of the air-conditioning system having multiple heat exchangers.

Some embodiments are based on the realization that a plurality of test control inputs may be generated based on a Gaussian Process. Then, the plurality of test control inputs as an input is provided to the model of the air-conditioning system to generate a predicted plurality of test outputs corresponding to the plurality of test control inputs. The control command is determined on the basis of the predicted test output of the simulation of the air conditioning system for the selected test control input on the basis of an optimization of a cost function associated with the plurality of test control inputs and the plurality of test outputs.

Some embodiments are based on the realization that one or more test control inputs of the previous time instant is utilized to generate the plurality of test control inputs based on the Gaussian Process for the next time instant, subsequent to the previous time instant.

Some embodiments are based on the realization that a sequence of test control inputs corresponding to finite plurality of time instants may be generated. The sequence of test control inputs as an input is provided to a model of the system to generate a sequence of predicted test outputs corresponding to the sequence of test control inputs. Then, a gradient of a cost function associated with the sequence of test control inputs and the sequence of test outputs is calculated. Further, the optimal test control input from the generated sequence of test control inputs is selected on the basis of the calculated gradient of the cost function and the control command is determined on the basis of the predicted test output of the simulation of the operation of the air conditioning system for the selected test control input. Such a process enables selection of the optimum test control input for the model of the air-conditioning system.

BRIEF DESCRIPTION OF THE DRAWINGS

The present disclosure is further described in the detailed description which follows, in reference to the noted plurality of drawings by way of non-limiting examples of exemplary embodiments of the present disclosure, in which like reference numerals represent similar parts throughout the several views of the drawings. The drawings shown are not necessarily to scale, with emphasis instead generally being placed upon illustrating the principles of the presently disclosed embodiments.

DETAILED DESCRIPTION

Figure 1:
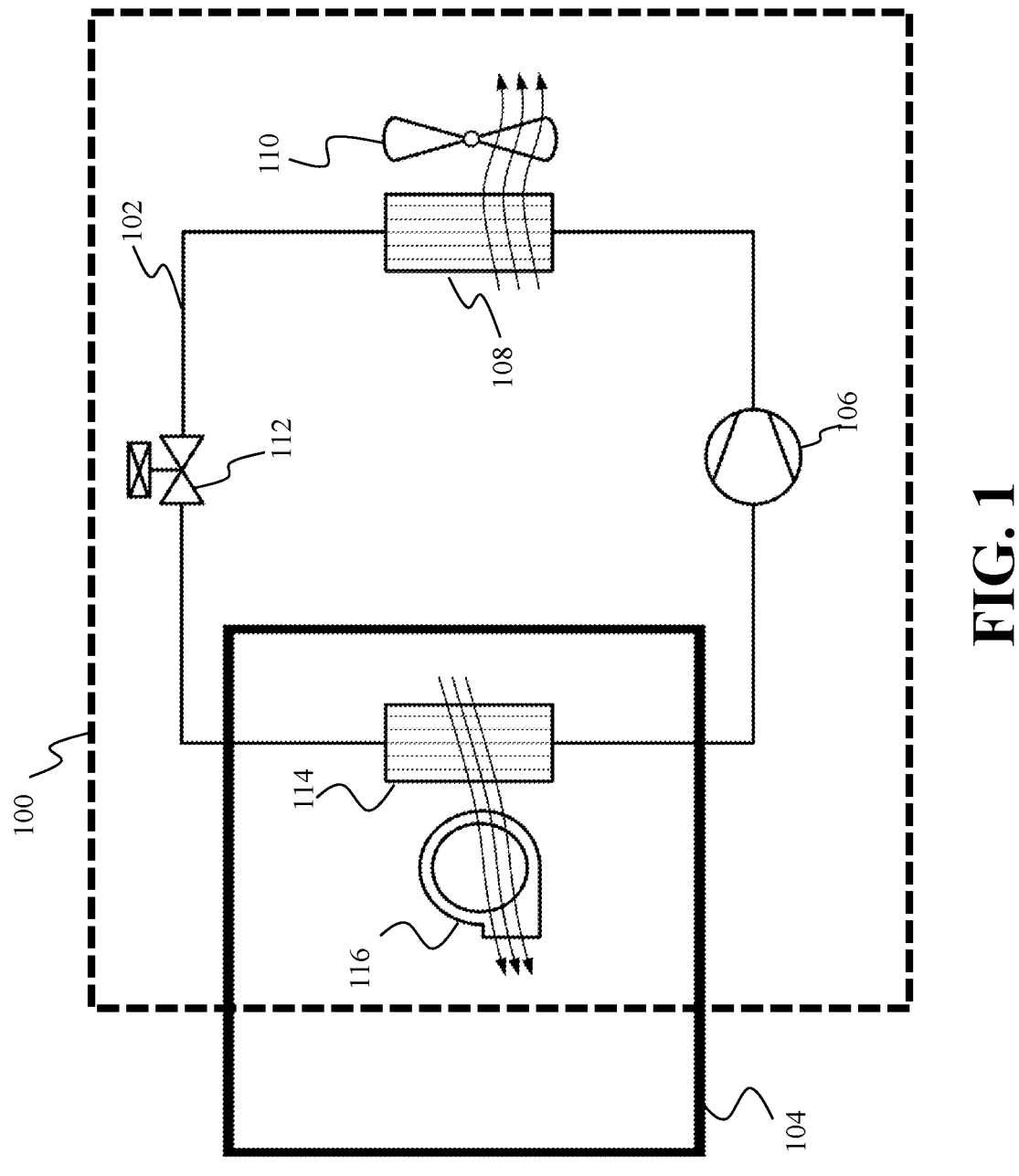
FIG. 1 illustrates a schematic diagram of an air-conditioning system, according to some embodiments of the present disclosure.

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure. Contemplated are various changes that may be made in the function and arrangement of elements without departing from the spirit and scope of the subject matter disclosed as set forth in the appended claims.

As used in this specification and claims, the terms "for example," "for instance," and "such as," and the verbs "comprising," "having," "including," and their other verb forms, when used in conjunction with a listing of one or more components or other items, are each to be construed as open ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Specific details are given in the following description to provide a thorough understanding of the embodiments. However, understood by one of ordinary skill in the art may be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

In describing embodiments of the disclosure, the following definitions are applicable throughout the present disclosure.

A "control system" or a "controller" may be referred to a device or a set of devices to manage, command, direct or regulate the behavior of other devices or systems. The control system may be implemented by either software or hardware and may include one or several modules. The control system, including feedback loops, may be implemented using a microprocessor. The control system may be an embedded system.

A "vapor compression system" refers to a system that uses the vapor compression cycle to move refrigerant through components of the system based on principles of thermodynamics, fluid mechanics, and/or heat transfer. The vapor compression systems may be, but are not limited to, a heat pump, refrigeration, and an air-conditioner system. Vapor compression systems are used in applications beyond the conditioning of residential or commercial spaces. For example, vapor compression cycles may be used to cool computer chips in high-performance computing applications.

"Components of a vapor compression system" refer to any components of the vapor compression system having an operation controllable by the control systems. The components include, but are not limited to, a compressor having a variable speed for compressing and pumping the refrigerant through the system; an expansion valve for providing an adjustable pressure drop between the high-pressure and the low-pressure portions of the system, and an evaporating heat exchanger and a condensing heat exchanger, each of which incorporates a variable speed fan for adjusting the air-flow rate through the heat exchanger.

An "evaporator" refers to a heat exchanger in the vapor compression system in which the refrigerant passing through the heat exchanger evaporates over the length of the heat exchanger, so that the specific enthalpy of the refrigerant at the outlet of the heat exchanger is higher than the specific enthalpy of the refrigerant at the inlet of the heat exchanger, and the refrigerant generally changes from a liquid to a gas. There may be one or more evaporators in the vapor compression system.

A "condenser" refers to a heat exchanger in the vapor compression system in which the refrigerant passing through the heat exchanger condenses over the length of the heat exchanger, so that the specific enthalpy of the refrigerant at the outlet of the heat exchanger is lower than the specific enthalpy of the refrigerant at the inlet of the heat exchanger, and the refrigerant generally changes from a gas to a liquid. There may be one or more condensers in a vapor compression system.

A "refrigerant circuit" refers to an interconnection of refrigerant pipes and components into a closed configuration, so that the refrigerant flows in a closed path between a series of components. Refrigerant circuits may be used to construct closed thermodynamic cycles to efficiently transfer thermal energy from one location to another. For example, a refrigerant circuit for a vapor compression system includes a compressor, a condensing heat exchanger, an expansion valve, and an evaporating heat exchanger, as well as the pipes that are used to convey the refrigerant from each component to the next.

An "electrical circuit" refers to an interconnection of wires that transmits electrical signals between components, such as processors, memory, or actuators.

"Set of control signals" refers to specific values of the inputs for controlling the operation of the components of the vapor compression system. The set of control signals includes, but is not limited to, values of the speed of the compressor, the position of the expansion valve, the speed of the fan in the evaporator, and the speed of the fan in the condenser.

A "setpoint" refers to a target value of the system, such as the vapor compression system, aiming to reach and maintain as a result of the operation. The term setpoint is applied to any particular value of a specific set of control signals and thermodynamic and environmental parameters.

A "computer" refers to any apparatus that is capable of accepting a structured input, processing the structured input according to prescribed rules, and producing results of the processing as output. Examples of a computer include a general-purpose computer; a supercomputer; a mainframe; a super mini-computer; a mini-computer; a workstation; a microcomputer; a server; an interactive television; a hybrid combination of a computer and an interactive television; and application-specific hardware to emulate a computer and/or software. A computer may have a single processor or multiple processors, which in operate in parallel and/or not in parallel. A computer also refers to two or more computers connected together via a network for transmitting or receiving information between the computers. An example of such a computer includes a distributed computer system for processing information via computers linked by a network.

A "central processing unit (CPU)" or a "processor" refers to a computer or a component of a computer that reads and executes software instructions.

A "memory" or a "computer-readable medium" refers to any storage for storing data accessible by a computer. Examples include a magnetic hard disk; a floppy disk; an optical disk, like a CD-ROM or a DVD; a magnetic tape; a memory chip; and a carrier wave used to carry computer-readable electronic data, such as those used in transmitting and receiving e-mail or in accessing a network, and a computer memory, e.g., random-access memory (RAM).

"Software" refers to prescribed rules to operate a computer. Examples of software include software; code segments; instructions; computer programs; and programmed logic. Software of intelligent systems may be capable of self-learning.

A "module" or a "unit" refers to a basic component in a computer that performs a task or part of a task. It may be implemented by either software or hardware.

A "controller," "control system," and/or "regulator" refer to a device or a set of devices to manage, command, direct or regulate the behavior of other devices or systems. The controller may be implemented by hardware, a processor with operation configured by the software, and combination thereof. The controller may be an embedded system.

FIG. 1 illustrates a schematic diagram 100 of an air-conditioning system 102, according to an embodiment of the present disclosure. The schematic diagram 100 includes a space 104 and the air-conditioning system 102 configured to provide heating or cooling to the space 104. The air-conditioning system 102 may include a variety of components, such as variable setting actuators to perform operations, such as refrigerant cycles. For example, the air-conditioning system 102 may include a variable-speed compression device 106, an outdoor heat exchanger 108, a variable-speed outdoor unit fan 110, an expansion device 112, an indoor heat exchanger 114, and an air circulation blower 116. The variety of components may be connected in a closed loop series refrigerant flow arrangement. The air-conditioning system 102 may act as a heating and cooling equipment and may provide occupants with thermal comfort by modulating a required capacity to match a load in the space 104. Air is conditioned by the indoor heat exchanger 114 and is transmitted by the air circulation blower fan 116 to the space 104. After absorbing or rejecting heat from the space 104, depending on the operating mode of the air-conditioning system 102, the air may be circulated back to the indoor heat exchanger 114.

In general, temporal dynamics of the air-conditioning system 102 majorly depends on dynamics of heat exchangers of the air-conditioning system 102. The heat exchanger of the air-conditioning system 102 may be the indoor heat exchanger 114 or the outdoor heat exchanger 108. The dynamics of the air-conditioning system 102 may be described by laws of conservation, i.e., balances of mass, energy, and momentum. In a physics-based analytical model of the heat exchanger, the complex differential algebraic equations (DAEs) need to be solved to predict the heat transfer and fluid flow dynamics that occur in the heat exchanger. Moreover, the complexity of the physics-based analytical model may increase significantly for large-size heat exchangers with complex circuitries.

It is an object of some embodiments to disclose a device for data-driven control of a system including the heat exchanger, such as the air conditioning system 102. It is another object of some embodiments to disclose a method for data-driven control of the system including the heat exchanger. The proposed device of the present disclosure may include a control system for data-driven control of dynamic behavior of the air conditioning system 102 that includes the heat exchanger. The control system and method proposed in the present disclosure eliminates the necessity of solving these complex DAEs. Typically, a single data-driven model of the entire air-conditioning system 102 requires a large amount of data to predict an output. To gather the large amount of data, a physics-based model of the air-conditioning system 102 needs to be executed with various inputs which may be a tedious task and increase the chances of errors. Moreover, a data-driven system model is not reusable even with slight changes in system architecture, unless additional inputs are included to accommodate those changes, which will inevitably increase model dimensionality. Instead, a modular based solution approach is more preferable. Specifically, on the component level, data-driven models are employed to entirely or partially replace the physics-based component models. On the system level, it follows the first principles to fulfill the conservation of mass, energy and momentum. Therefore, controlling a data-driven model for a component of the air-conditioning system 102 according to the present disclosure, allows reduction in the requirement of data as wells as eliminates the complications of model training. When any component in the air-conditioning system 102 is modified or added, only the data-driven model for the particular component needs to be regenerated and other models can remain the same. Further, a number of model equations generated by the data-driven model does not depend upon the geometry, size, circuitry pattern, and operating conditions of components such as heat exchangers. Therefore, the data-driven model is efficient to solve in real-time making it advantageous for online control of any machine including the heat exchanger.

It may be understood, that in the present disclosure, a case of an air-conditioning system is considered for employing the data-driven control. However, such data-driven control may be equivalently used in any machine including at least one heat exchanger. Examples of the machines are, but are not limited to, a vehicle system, a smart grid system, a factory automation system, a transportation system, a self-tuning machines system, and a traffic network.

Figure 2A:
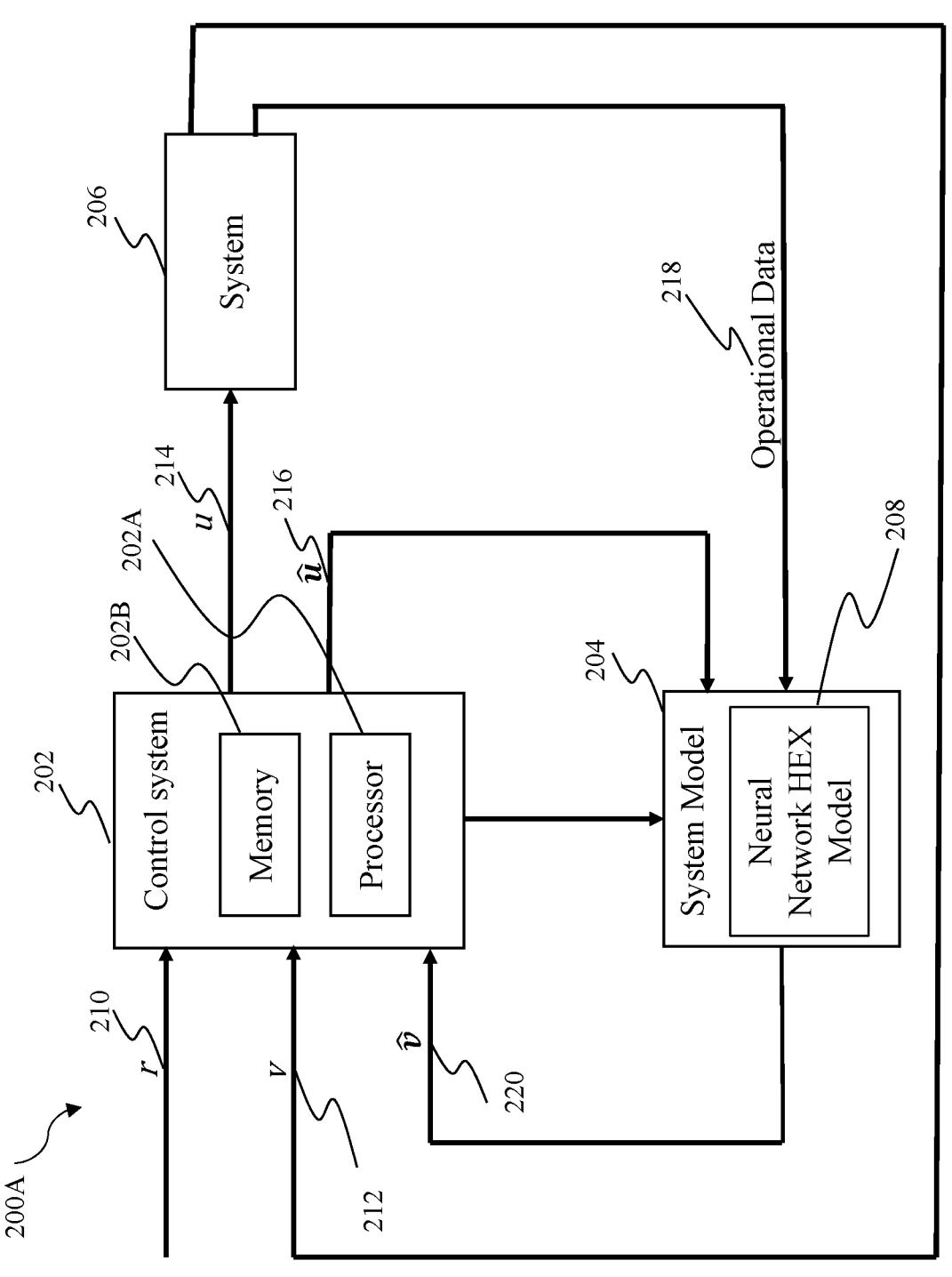
FIG. 2A illustrates a block diagram of a control system leveraging a model to control the air-conditioning system, according to some embodiments of the present disclosure.

FIG. 2A illustrates a block diagram 200A of a control system 202 leveraging a model 204 to control the air-conditioning system 102, according to an embodiment of the present disclosure. The block diagram 200A may further include a system 206. The system 206 includes the air-conditioning system 102 and the space 104.

In an embodiment, the control system 202, the model 204 and the system 206 communicate via a network (not shown in FIG. 2A). The network may include public networks such as an Internet, a telephone network, and a satellite communication network and/or a Local Area Network (LAN), a Wide Area Network (WAN) such as Ethernet (registered trademark). In addition, the examples of the network may include leased line networks such as Internet Protocol-Virtual Private Network (IP-VPN). In addition, the network may include wireless communication networks of Wi-Fi (registered trademark), Bluetooth (registered trademark), and the like.

The control system 202 is configured to control functions of the system 206. The control system 202 comprises at least one processor, such as a processor 202A configured to execute computer executable instructions. The control system 202 further comprises a memory 202B that stores the computer executable instructions that are executable by the processor 202A. The processor 202A may be a single core processor like central processing unit (CPU), a multi-core processor, a computing cluster, or any number of other configurations. The memory 202B may include a non-transitory memory such as random access memory (RAM), read only memory (ROM), flash memory, or any other suitable memory systems. The processor 202A is configured to control functions of all the components of the control system 202. Further, the control system 202 is configured to generate an actuator command to control the system 206. In addition, the control system 202 controls the model 204 for execution and training of the model 204 by the processor 202A.

The model 204 includes a simulation model of the air-conditioning system 102 and the space 104. The test control input is transmitted by the control system 202 to the model 204. The model 204 includes a heat exchanger model with a neural network 208, which is configured to simulate an operation of a heat exchanger corresponding to a test control input in each time-step of a multi-step prediction as described with reference to FIG. 2B later. The data-driven heat exchanger model enables the system model 204 of the air-conditioning system 102 to become more computationally efficient by eliminating the necessity to solve complex DAEs. The details of the neural network heat exchanger model are further provided with reference to FIG. 2B and FIG. 3A.

The control system 202 may receive a reference signal 210 (also denoted as "r") and measurement data 212 (also denoted as "v") from the system 206 and produce an actuator command output 214 (also denoted as "u") to control the operation of the system 206. The actuator command output 214 is optimized to minimize a cost function while meeting the reference signal 210. In one embodiment, the cost function may be power consumption of the system 206. In another embodiment, the cost function may be a tracking error between the reference signal 210 and the measurement data 212. In one embodiment, the reference signal 210 may be associated with, for example, an air temperature of the space 104 and a suction superheat of the air-conditioning system 102. In another embodiment, the reference signal 210 may be the air temperature of the space 104 and a discharge temperature of a component of the air-conditioning system 102. The actuator command output 214 may be associated with at least one of a compressor speed, valve opening, or fan speeds of the air-conditioning system 102.

The processor 202A of the control system 202 generates test control inputs 216 and transmits it to the model 204 of the system 206. Unlike the first principles models of vapor compression systems, which are built based on the laws of conservation and are very computationally expensive because of the resulting DAEs, the model 204 is comprised of data-driven component models that are extremely fast and allows many simulations within a short period of time. The processor 202A is further configured to execute the model 204 based on historical operational data 218 from the system 206 and the test control inputs 216 from the control system 202 to obtain corresponding test output 220. The control system 202 may evaluate the test control inputs 216 based on various metrics and determine the actuator command output 214 ($u$) for the system 206.

Figure 2B:
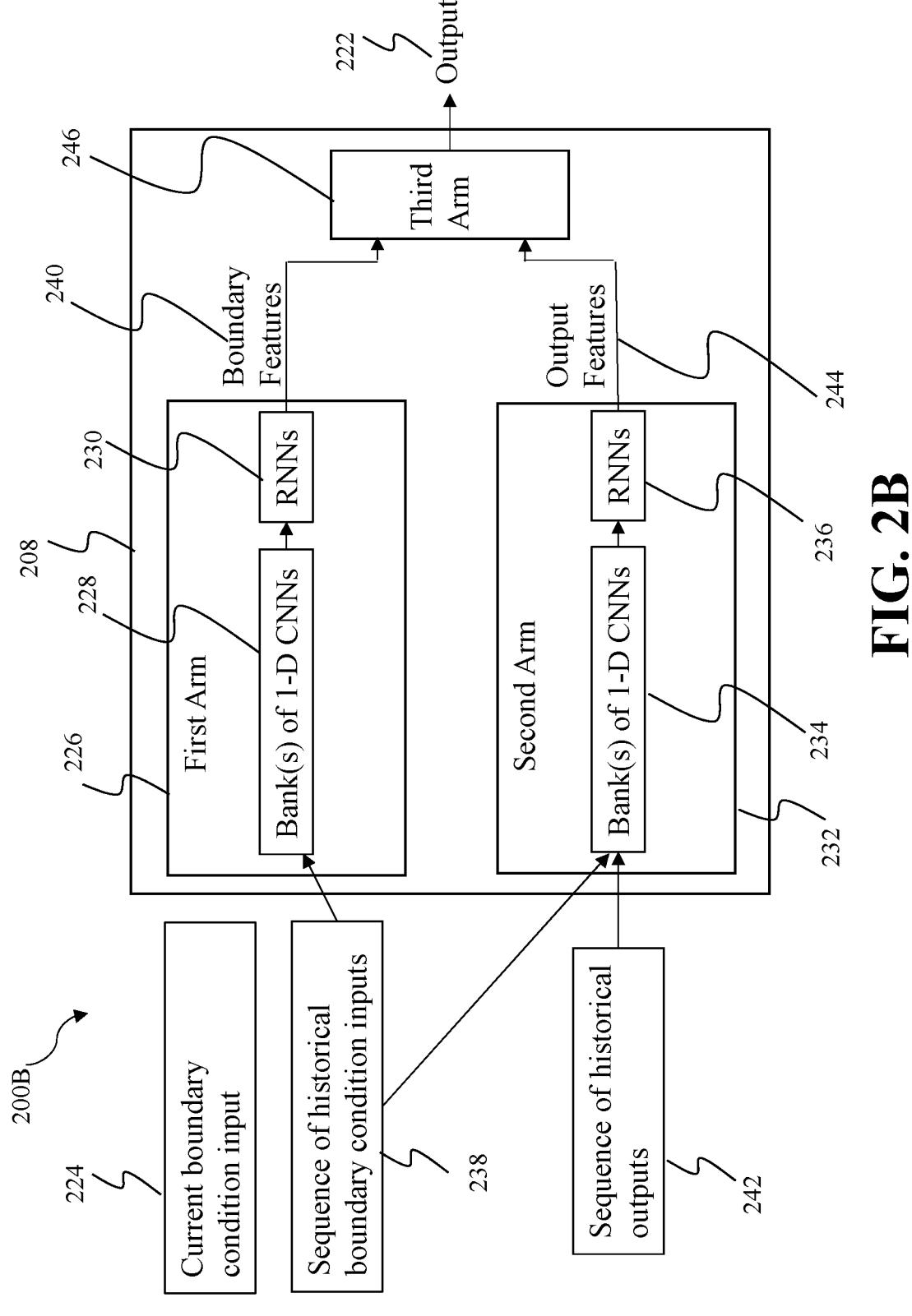
FIG. 2B illustrates a block diagram of a neural network for predicting a test output of an operation of a heat exchanger corresponding to a test control input in a single time-step prediction, according to some embodiments of the present disclosure.

FIG. 2B illustrates a block diagram 200B of the neural network 208 for predicting a test output 222 of the operation of the heat exchanger corresponding to a test control input 224 in a single time-step prediction.

The neural network 208 includes a first arm 226 having a first combination of convolutional and recurrent networks. The first combination of convolutional and recurrent networks includes a bank of one-dimensional (1-D) convolutional neural networks (CNNs) 228 and recurrent neural networks (RNNs) 230. The neural network 208 further includes a second arm 232 having a second combination of convolutional and recurrent networks. The second combination of convolutional and recurrent networks includes a bank of 1-D CNNs 234 and RNNs 236. The bank of 1-D CNNs 228 of the first arm 226 is provided with the test control input 224 and a sequence of historical control inputs 238 to extract control features 240. The control features 240 indicate variation of the test control input 224 from the sequence of historical control inputs 238. The first arm 226 is configured to process the test control input 224 appended to the sequence of historical control inputs 238 with the first combination of the bank of 1-D CNNs 228 and RNNs 230. The bank of 1-D CNNs 234 of the second arm 232 is provided with a sequence of historical outputs 242 which is paired with the sequence of historical inputs 238 to extract output features 244. The output features 224 indicates a dynamical coupling between the test control input 224 and the corresponding test output 222 of the operation of the heat exchanger. The second arm 232 is configured to process the sequence of historical outputs 242 which is paired with the sequence of historical inputs 238 with the second combination of the bank of 1-D CNNs 234 and RNNs 236. The neural network 208 further includes a third arm 246 configured to process the control features 240 and the output features 244 to predict the test output 222 of the operation of the heat exchanger corresponding to the test control input 224.

Figure 3A:
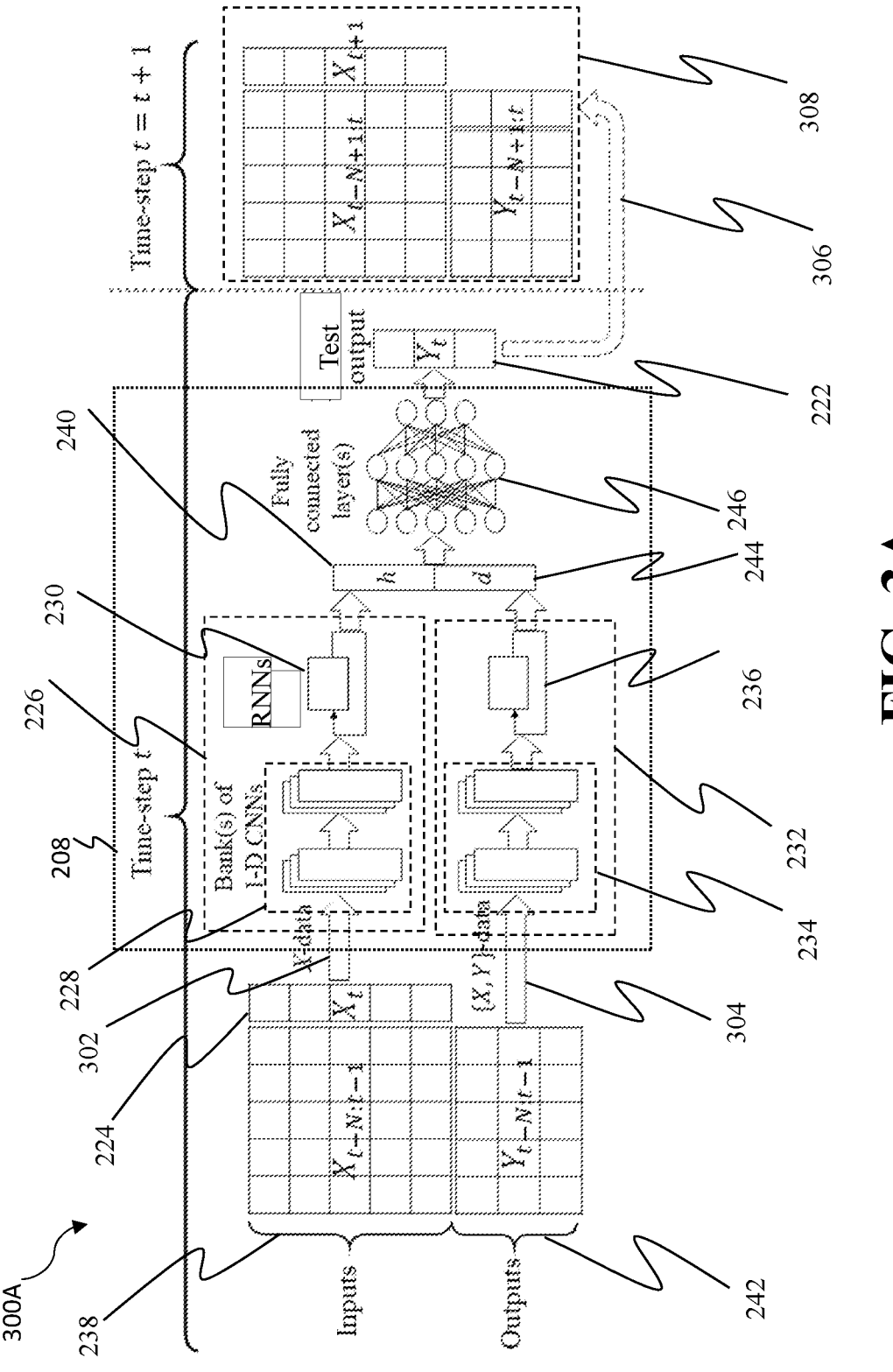
FIG. 3A illustrates a detailed architecture of the neural network trained to simulate an operation of a heat exchanger included in the air-conditioning system at a time-step, according to some embodiments of the present disclosure.

FIG. 3A illustrates an architecture 300A of the neural network 208 trained to simulate an operation of the heat exchanger included in the air-conditioning system 102 at a time-step t, according to an embodiment of the present disclosure. For example, the neural network 208 may be trained to simulate the operation of the heat exchanger.

The dynamics of the heat exchanger may be described in the abstract input-output form by following equation:

$$Y_{0:T} = \Phi(X_{0:T}, x_0) \qquad (1)$$

where $\Phi$ is an unknown function that corresponds to an input-output map that generates trajectories of observable outputs, given inputs and an initial state of the heat exchanger of the air-conditioning system 102. The sequence $Y_{0:T}$ denotes observable outputs of the heat exchanger collected over the time range [0,T]. Similarly, $X_{0:T}$ denotes the set of inputs to the heat exchanger, often referred to as boundary conditions. The initial internal state of the heat exchanger is described by $x_0$.

The set of boundary conditions X consist of the inlet conditions for each fluid stream, such as the mass flow rate, the pressure, and the specific enthalpy or other thermodynamic variables. The initial state variables $x_0$ represent the initial values of the differential variables of the neural network 208, such as pressure and specific enthalpy of the fluid in each control volume or temperature of the tube wall. Finally, the set of output variables Y may consist of variables defined in each volume, such as the leaving air temperature or moisture content from each volume, or it may consist of aggregate variables for the entire heat exchanger, such as the total thermal power transferred from one fluid to the other.

A deep state-space modeling framework is incorporated in the neural network 208 that combines the feature extraction capabilities of CNNs with the sequence prediction properties of RNNs.

According to some embodiments, gated recurrent units (GRUs) may be used here as the RNNs 230 and/or RNNs 236. The GRUs are efficient recurrent neural cells configured to analyze extracted temporal features to learn the system dynamics. According to some embodiments, the bank of 1-D CNNs 228 and the bank of 1-D CNNs 234 are used here for a first-stage analysis of the time-series data. Hence, the architecture of the neural network 208 may be referred as CNN-GRU deep state-space models (SSM). The CNN-GRU SSM employs a 'lookback' window of length N, consisting of the sequence of historical control inputs $(X_{t-N:t-1})$ 238 along with the sequence of historical outputs $(Y_{t-N:t-1})$ 242 corresponding to the sequence of historical control inputs $(X_{t-N:t-1})$ 238. A combination of such past inputs, along with a current input $(X_t)$, may be used to generate the prediction of the test output $(Y_t)$ 222 at a next time-step "t". Further, the sequence of historical control inputs $(X_{t-N:t-1})$ 238 and the sequence of historical outputs $(Y_{t-N:t-1})$ 242 constitutes a part of the operational data 208 and the test control input $(X_t)$ 224 constitutes a part of the test control inputs 216 as referred in FIG. 2B.

Further, the processor 202A (shown in FIG. 2A) is configured to generate the windowed data sequences that pass through two paths: $X_{t-N:t}$ for an upper X-path 302, and a combination of $X_{t-N:t-1}$ with $Y_{t-N:t-1}$ for a lower (X; Y)-path 304. For the upper X-path 302 and the lower (X; Y)-path 304, the windowed data sequences pass through the CNN-GRU SSM of the first arm 226 and the second arm 232 respectively. To that end, the windowed data flows through the bank of 1-D CNNs 228 and the bank of 1-D CNNs 234, respectively, for the feature extraction. The upper X-path 302 extracts features from a time-series of inputs that includes the test control input $(X_t)$ 224 and seeks to learn effect of predicted outputs from variations in the inputs observed thus far. The lower (X; Y)-path 304 extract features that are relevant to learning how the inputs and outputs are coupled in the dynamical system. Further, both the upper X-path 302 and the lower (X; Y)-path 304 continue into their respective RNNs 230 and RNNs 236, which model how the internal hidden state performs an update based on the features extracted from the bank of 1-D CNNs 228 and the bank of 1-D CNNs 234, respectively.

Given a vector of CNN-extracted features $\phi_t$, a current internal state $h_{t-1}$ of the GRU, the reset gate vector $r_t$, the update gate vector $z_t$, and the candidate activation $\hat{h}_t$, the internal state update of the GRU is given by:

$$h_t = z_t \odot h_{t-1} + (1-z_t) \odot \hat{h}_{t-1} \qquad (2)$$

where $\odot$ is the Hadamard product, and $$r_t = \sigma_r(W_r^0 \phi_t + W_r^1 h_{t-1} + W_r^2) \qquad (3)$$

$$z_t = \sigma_z(W_z^0 \phi_t + W_z^1 h_{t-1} + W_z^2) \qquad (4)$$

$$\hat{h}_t = \tanh(w_h^0 \phi_t + W_h^1(r_t \odot h_{t-1}) + W_h^2) \qquad (5)$$

where σ denotes sigmoid activation functions, and W matrices are neural weights. Specifically, $$W_r^0 \text{ and } W_r^1$$

are the weights for the reset corresponding to the features and current internal state, while $$W_r^2$$

denotes the bias for this gate. Similarly $$W_z^0, W_z^1 \text{ and } W_z^2$$

are the weights and bias for the update gate. Finally, $$W_h^0$$

is the weight for the features, $$W_h^1$$

are the weights for the Hammard product of the reset gate output vector and the current internal state and $$W_h^2$$

is bias vector at the activation gate. The upper X-path 302 is a first path which is assigned to a first neural weight, and the lower (X; Y)-path 304 is a second path which is assigned to a second neural weight. The first neural weight may be different from the second neural weight and hence the first path and the second path can be trained concurrently.

An internal state of the upper X-path 302 which is the extracted control features 240 denoted by "h"", whereas the internal state of the lower (X; Y)-path 304 which is the extracted output features 244 denoted by "d" at the time instant t. Therefore, the internal state of the RNNs 230 is "h" 240 and the internal state of the RNNs 236 is "d" 244. The internal states h 240 and d 244 are concatenated into a single augmented state vector which are passed through a final set of the third arm 246. The third arm 246 includes fully connected layers where every input neuron is connected to every output neuron. The purpose of the fully connected layers is to project the augmented RNN states to the output space The augmented state vector may be a tensor which is accepted by the third arm 246. An output of the third arm 246 is the predicted test output $Y_t$ 222.

Then, the predicted output $Y_t$ 222 is passed to the next time step 306 and is used to generate the (X; Y) data 308 for the next time step.

The proposed architecture of the neural network 208 is designed to promote some specific beneficial properties. For example, adding the bank of 1-D CNN layers promotes extraction of temporal features and preprocessing that aids the GRU cell.

Figure 3B:
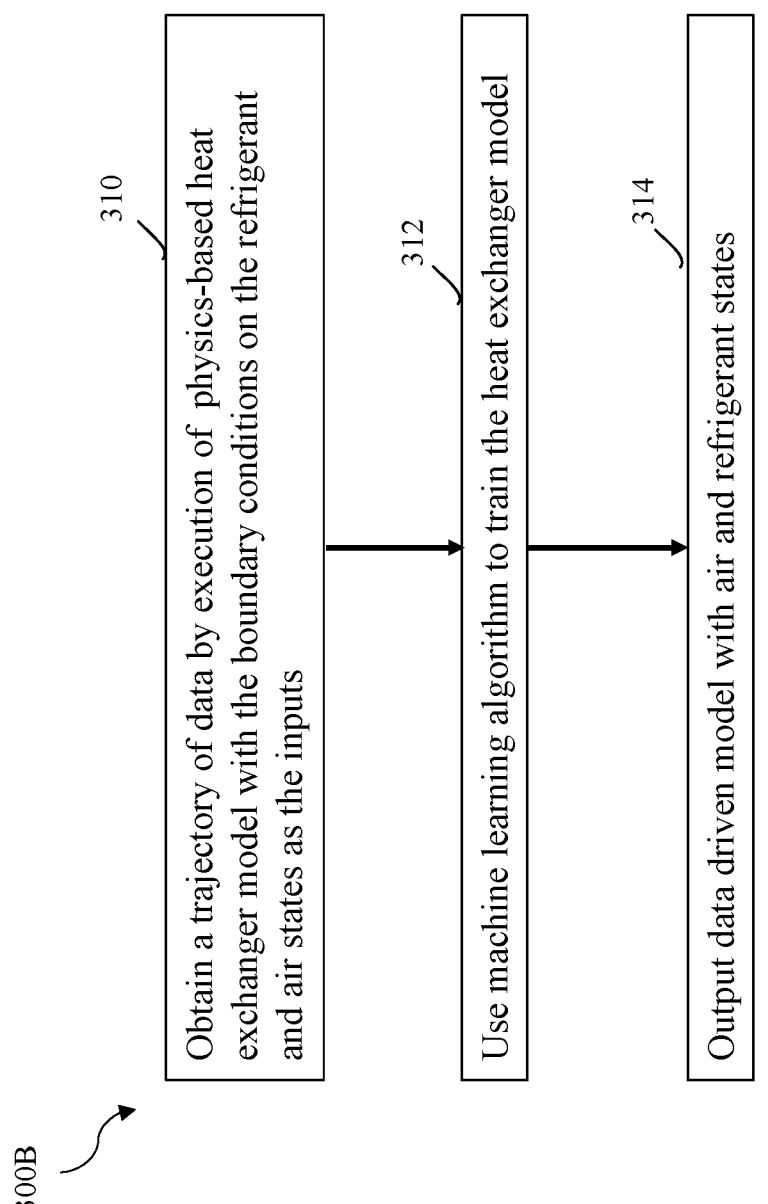
FIG. 3B illustrates a flowchart of an exemplar process of training the neural network, according to some embodiments of the present disclosure.

FIG. 3B illustrates a flowchart 300B of an exemplar process of training the neural network 208, according to an embodiment of the present disclosure. At block 310, the training data is collected to train the neural network 208. To that end, a trajectory of data $$\{X_t, Y_t^*\}_{t=0}^T$$

is obtained by running the physics-based model with the boundary conditions associated with the heat exchanger as inputs. For example, the boundary conditions associated with the heat exchanger may be the boundary condition on the refrigerant and air sides. The examples of the refrigerant side input may be, but are not limited to, the refrigerant mass flow rate and the refrigerant enthalpy flow rate. The examples of the air side input can be, but are not limited to, the air mass flow rate, the air enthalpy flow rate, and the relative humidity. The data-driven model does not need to solve the full physics equations and instead learns non-linear relationships between inputs and outputs to capture their relationship. Thus, it can be successfully trained using only a sub-section of the total state-space needed to be solved for in the physics-model. This reduces the need to solve the full set of complex DAEs defining the system and models a 'partial' subset that is useful to needs of the modeling effort.

At block 312, the neural network 208 may be trained based on the trajectory of data $$\{X_t, Y_t^*\}_{t=0}^T.$$

The processor 202A may apply a machine learning algorithm on the trajectory of data $$\{X_t, Y_t^*\}_{t=0}^T$$

to train the neural network of the neural network 208. The machine learning algorithm may be a supervised learning, an unsupervised learning, a semi-supervised learning, or a reinforcement learning. The details of the process of the training will be described in FIG. 3C. The neural network 208 is trained to learn a mapping function from input data to output data of the system. To that end, the neuron weights of the neural network 208 is updated to minimize an error of the neural network 208 while processing the one or more datasets associated with the trajectory of data $$\{X_t, Y_t^*\}_{t=0}^T.$$

Further, at block 314, the training of the neural network 208 is completed and refrigerant states and air states are received as outputs.

Figure 3C:
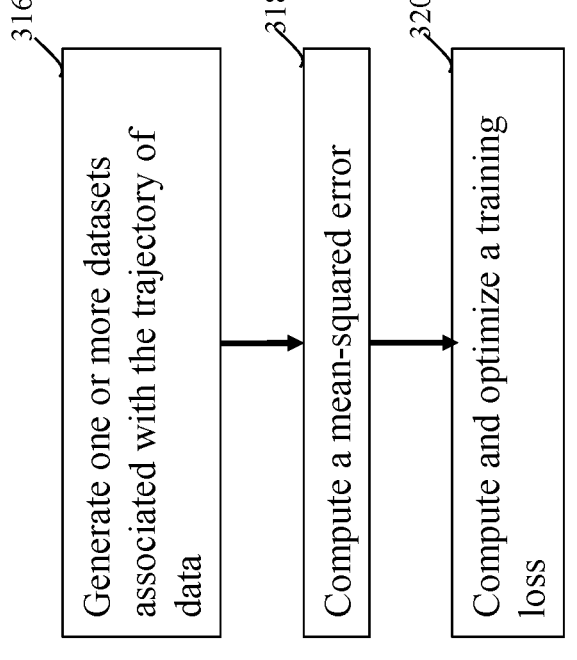
FIG. 3C illustrates a flowchart for optimization of a training loss for the training of the neural network, according to some embodiments of the present disclosure.

FIG. 3C illustrates a flowchart 300C for optimization of a training loss for the training of the neural network 208, according to an embodiment of the present disclosure. The flowchart 300C specifically illustrates an expansion of the step 312 of FIG. 3B.

At block 316, the processor 202A is configured to generate a plurality of batches of the trajectory of data to generate one or more datasets. To that end, the entire trajectory of data $$\{X_t, Y_t^*\}_{t=0}^{T}$$

is partitioned into contiguous (time wise) blocks of training, validation, and testing sets. Therefore, a plurality of batches such as mini batches of the training data for each of the training, validation, and testing are constructed for scalability to large datasets, Within each of the training and validation sets, the data is rearranged to construct windowed data of the sequence of historical control inputs 238 and the sequence of historical outputs 242. Each of the sequence of historical control inputs 238 and the sequence of historical outputs 242 are of length N and comprising $X_{t-N:t-1}$ and $Y_{t-N:t-1}$, respectively. The plurality of batches further comprises the test control input $X_t$ 224 to the air-conditioning system 102 and a true output $$Y_t^*$$

of the air-conditioning system 102.

By considering windows of length N rather than the entire dataset, the backpropagation-in-time unwrapping needed for training GRUs is not prohibitive which eventually reduces the training time of the GRU cells. Apart from time-efficiency, avoiding the requirement of learning from the entire time-series at once and instead employing batching allows for scalability in the face of large datasets, parallelizability, and improves storage efficiency. In addition to that, by forcing the algorithm to treat each windowed time-series segment independently of any other windows (including consecutive ones), the proposed deep SSM learns a one-step update of the dynamics that is independent of start-time, while time-dependence is embedded in the internal state vector of the GRU cells. This style of modeling is often advantageous over auto-regressive approaches where the predictions of the neural SSM is used in future predictions, as recursion of estimates can often lead to error accumulation and degradation of model performance.

At block 318, the processor 202A is configured to compute a mean-squared error for each batch of the plurality of batches, based on a predicted output of the air-conditioning system 102 and a true output of the air-conditioning system 102. To that end, the processor 202A executes one time-step predictions are for each batch of the plurality of batches. The predicted output $Y_t$ and the true output $Y_t^*$ are then used to compute a batch-wise mean-squared error $$\varepsilon_k := (1/|B_k|)\sum_{t \in B_k} \|Y_t - Y_t^*\|_2^2 \qquad (6)$$

where $B_k$ is the k-th batch; typically $|B_k|$ is identical across all k batches and is the batch-size.

At block 320, a training loss associated with the computed mean-squared error for each batch of the plurality of batches and is determined and optimized. To that end, a training loss is computed based on the sum $\Sigma_k \varepsilon_k$ across all k batches for the training set. The training loss analyzes fitting of a deep learning model in the training data. The training loss can be optimized using at least one of a stochastic gradient descent or variants of the stochastic gradient descent.

Further, a validation loss is calculated based on sum $\Sigma_k \varepsilon_k$ across all k batches for the validation set. The validation loss analyzes the requirement of further training or adjustment in a model. The validation loss is calculated to be used for early stopping.

Figure 4:
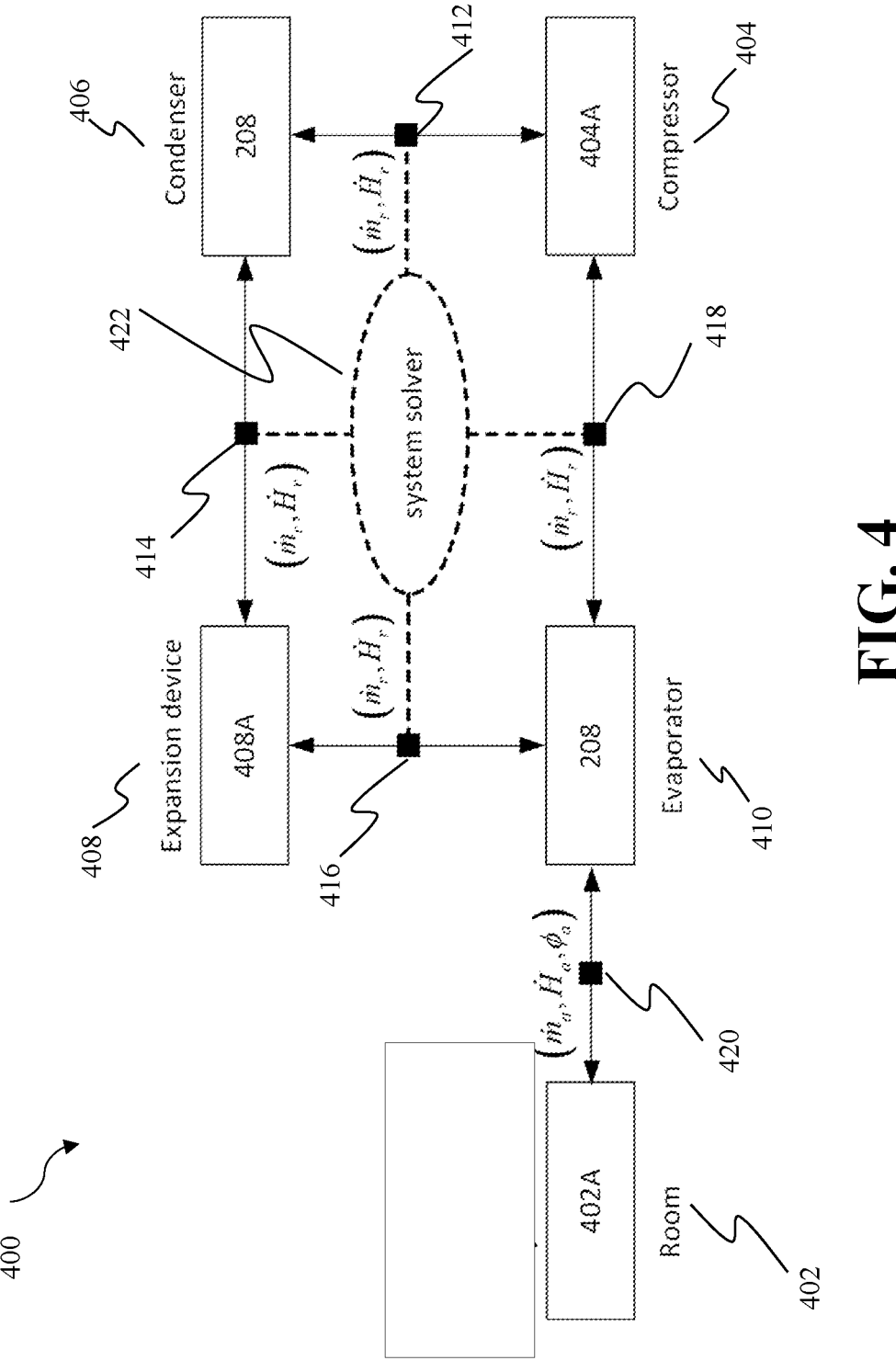
FIG. 4 shows an exemplar diagram of a model of the air-conditioning system, according to some embodiments of the present disclosure.

FIG. 4 shows an exemplar diagram 400 of the model 204, according to an embodiment of the present disclosure. The model 204 may include a room model 402A of a room 402 and a plurality of models of corresponding components of the air-conditioning system 102. The examples of the components of the air-conditioning system 102 may include a compressor 404, a condenser 406, an expansion device 408, and an evaporator 410. The examples of the plurality of component models may include a performance map based compressor model 404A of the compressor 404, the neural network 208 of the condenser 406, a performance map based expansion device model 408A of the expansion device 408, the neural network 208 of the evaporator 410. Further, the room model 402A may be a lumped-parameter room model. In a lumped-parameter model, spatial variations of parameters can be ignored, and a system can be described by adjustable parameters. Further, the room 402 includes the space 104 where the air-conditioning system 102 configured to provide heating or cooling.

The performance map based model maps the performance of a component based on experimental data corresponding to the component. One of the examples for the performance map based compressor model is the ARI 10-coefficient compressor model, which calculates the mass flow rate of the compressor and the compressor power based on the saturated suction and discharge temperatures. There are also other kinds of performance map based compressor models, which determine the mass flow rate and power consumption based on the suction and discharge pressures. For the performance map based expansion valve model, generally these models calculate the mass flow rate through the valve based on the pressure difference across the valve with the flow coefficient being a function of valve opening.

Further, the component models such as the performance map based compressor model 404A, the neural network 208, and the performance map based expansion device model 408A are connected together to form a closed-loop refrigerant cycle. A junction 412 between the compressor model 404A and the neural network 208 of the condenser 406, a junction 414 between the neural network 208 of the condenser 406 and the performance map based expansion device model 408A, a junction 416 between the performance map based expansion device model 408 and the neural network 208 of the evaporator 408, and a junction 418 between the performance map based compressor model 404A and the neural network 208 of the evaporator 410 may correspond to refrigerant mass flow rate ($\dot{m}_r$) and refrigerant enthalpy flow rate ($\dot{H}_r$).

All the component models implement the same standard interface so that the model 204 may deal with arbitrary system configurations and a component-based solution scheme may be adopted. Therefore, the outlet boundary condition of an upstream model is the inlet boundary condition of the downstream model. Specifically, the compressor model 404A is the upstream model of the condenser model 208. The condenser model 208 is upstream model of the expansion device model 408A. The expansion device model 408A is the upstream model of the evaporator model 208. The evaporator model 208 is the upstream model of the compressor model 404A. Likewise, the condenser model 208 is the downstream model of the compressor model 404A. The expansion device model 408A is the downstream model of the condenser model 208. The evaporator model 208 is the downstream model of the expansion device model 408A. The compressor model 404A is the downstream model of the evaporator model 208.

Since the air is recirculated in the space 104, an interface 420 between the data-driven evaporator model 408A and the room model 402A includes the air mass flow rate ($\dot{m}_a$), the air enthalpy flow rate ($\dot{H}_a$), and relative humidity ($\phi_a$) associated with the room model 310 and the evaporator model. The model 204 is based on a multi-step prediction. To that end, the model 204 predicts a test output at each time-step based on a corresponding test control input of that time-step. The processor 202A of the control system 202 may control a system solver 422 to solve all the component models in a systematic way and ensure the conservation of mass, energy and momentum at each junction of the model 204 on the system level for the test control input of each step.

Figure 5:
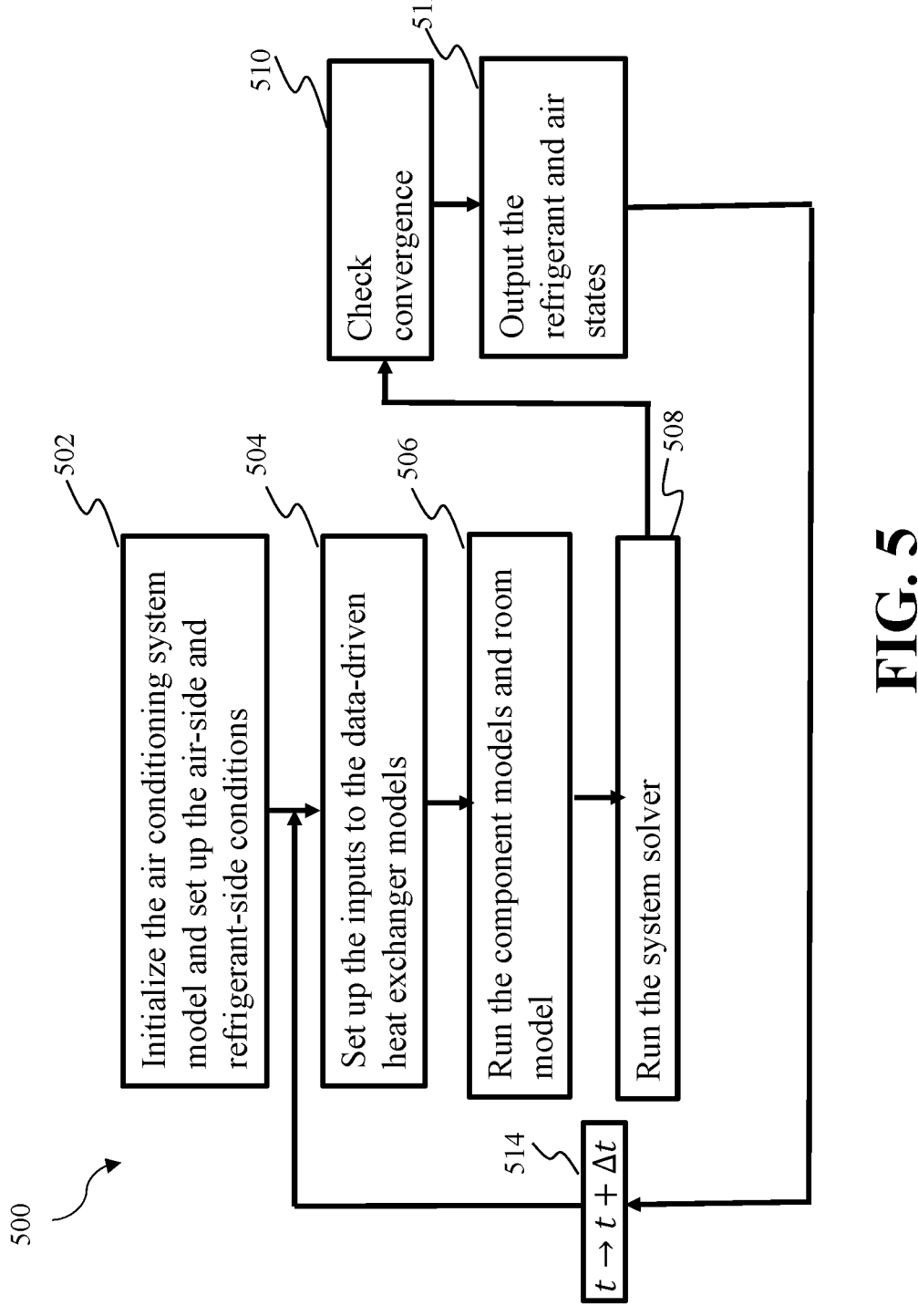
FIG. 5 illustrates a flowchart for generation of one or more states associated with a room model and a plurality of component models of the air-conditioning system, according to some embodiments of the present disclosure.

FIG. 5 illustrates a flowchart 500 for generation of one or more states associated with the room model 402A and the plurality of component models of the air-conditioning system 102, according to an embodiment of the present disclosure. At block 502, the processor 202A configured to initialize the model 204 of the system 206 and determine one or more conditions associated with the air side and the refrigerant side of the heat exchangers. The parameters of the air-side conditions of the heat exchangers are the air mass flow rate, the air temperature, and relative humidity. The initial condition of the refrigerant-side of the heat exchangers are refrigerant pressure distribution and refrigerant enthalpy distribution. Based on the initial conditions and boundary conditions, the model 204 of the system 206 are fully defined.

At block 504, the sequence of historical control inputs and the sequence of historical outputs of the operation of the heat exchanger are provided as inputs to the neural network 208 of the heat exchanger models.

Further, at block 506, the processor 202A executes all the component models such as the performance map based compressor model 404A, the neural network 208 of the condenser 406, the performance map based expansion device model 408A, and the neural network 208 of the evaporator 410 along with the room model 402A. Since the refrigerant flow states at the interface 412, 414, 416 and 418 and the air flow states at the interface 420 of the system model 204 are the iteration variables, these models are mathematically in a closed-form and can be executed independently.

At block 508, the processor 202A is configured to gather the outputs obtained at block 506 from each component model of the air-conditioning system 102. Then the system solver 422 formulates the residual equations at each interface such as the interface 412, the interface 414, the interface 416, and the interface 418 to ensure the mass, energy and momentum conservation.

At block 510, the processor 202A is configured to execute the system solver 422 that determines if convergence criteria based on the mass, energy and momentum conservation are satisfied at each interface.

At block 512, the processor 202A generates one or more states associated with each of the room model and the plurality of component models. The one or more states include at least one of a refrigerant state or an air state associated with the air-conditioning system 102. Further, the one or more states associated with each model is obtained based on the determination of the convergence criteria at block 510 and used as the initial conditions for the calculation of the next time step.

At block 514, the process of setting the input to the neural network 208 repeats at each time step until the entire simulation of the heat exchanger is completed.

Figure 6:
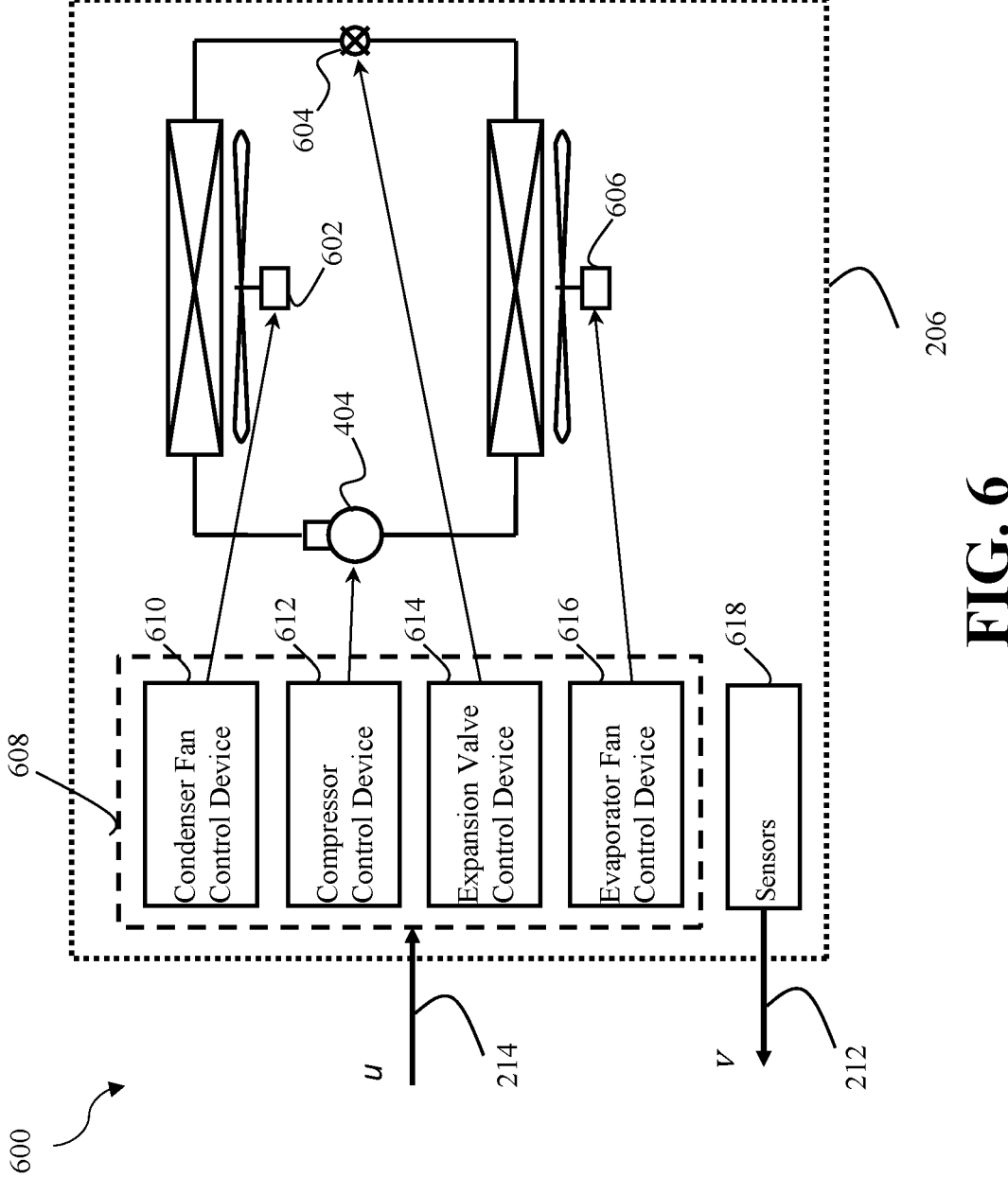
FIG. 6 illustrates a block diagram illustrating different components of the control system for controlling the air-conditioning system, according to some embodiments of the present disclosure.

FIG. 6 illustrates a block diagram 600 illustrating different components of the control system 202 for controlling the air-conditioning system 102, according to an embodiment of the present disclosure. The components of the system 206 include the compressor 404, a condenser fan 602 of the condenser 406, the expansion valve 604, and an evaporator fan 606 of the evaporator 410. An electrical circuitry 608 includes a condenser fan control device 610 to control one or more parameters of the condenser fan 604, a compressor control device 612 to control one or more parameters of the compressor 404, an expansion valve control device 614 to control one or more parameters of the expansion valve 604, and an evaporator fan control device 616 to control one or more parameters of the evaporator fan 606. For example, the control devices such as the condenser fan control device 610, the compressor control device 612, the expansion valve control device 614, the evaporator fan control device 616 may control, but not limited to, a speed of the condenser fan 602 and evaporator fan 606, a threshold, ratio, knee, attack time, release time, or makeup gain of the compressor 404, a valve body, a diaphragm, a pin or needle, a spring, a sensing bulb and capillary line of the expansion valve 604. Further, the control devices of the electrical circuitry 608 may execute control processes to control the components of the system 206 based on the actuator command output 214 received from the control system 202. In addition to that, the components of the system 206 generates a corresponding output in response to the control process executed by the electrical circuitry 608 based on the actuator command output 214. Each component of the air-conditioning system 102 of the system 206 has one or more sensors attached therewith. The group of sensors are collectively referred here as sensors 618. The sensors 618 records the measurement data 212 of the air-conditioning system 102 and transmit back to the control system 202. The control system 202 controls the simulation of the model 204 to reduce an error between the reference signal 210 and the measurement data 212.

Figure 7A:
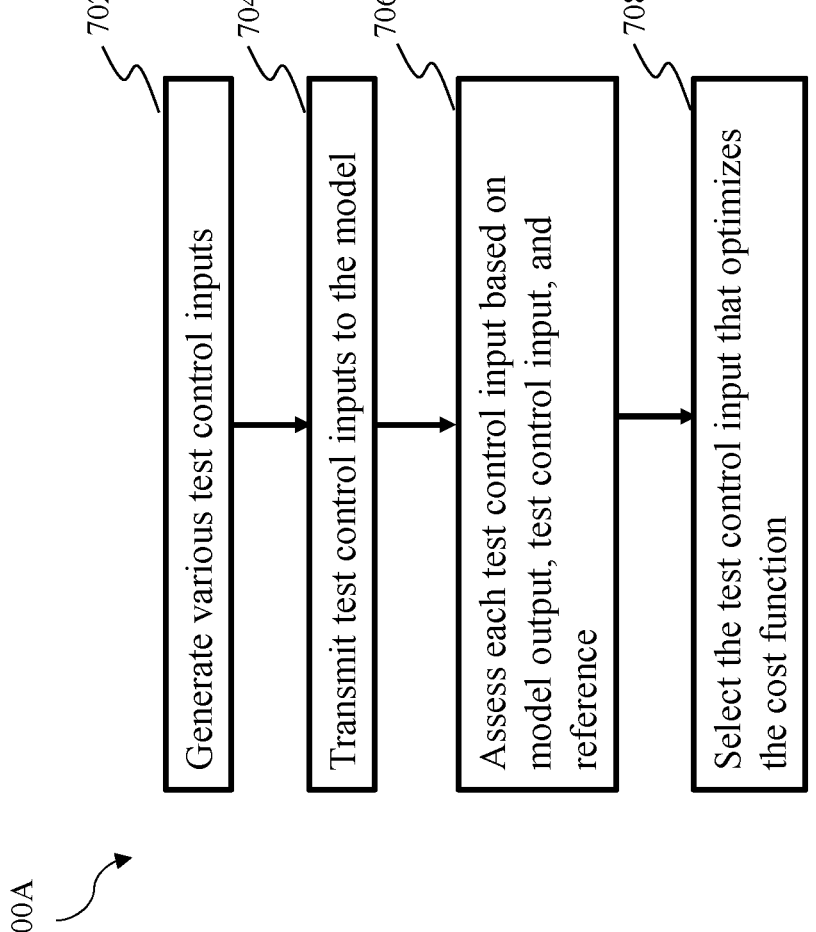
FIG. 7A illustrates a flowchart of an exemplar method for selection of an optimum test control input from a plurality of test control inputs based on a Gaussian Process, according to some embodiments of the present disclosure.

FIG. 7A illustrates a flowchart 700A of an exemplary method for selection of an optimum test control input from the test control inputs 216 based on a Gaussian Process, according to an embodiment of the present disclosure. In this embodiment, at the current time, the control system 202 generates an optimal control input for the next time step ahead. To that end, at block 702, the processor 202A is configured to generate the test control inputs 216 based on a Gaussian Process. At block 704, the test control inputs 216 is transmitted to the model 204. At block 706, the processor 202A receives a plurality of test outputs 220 predicted by the model 204 corresponding to the test control inputs 216. To that end, simulations of the model 204 are carried out for each of the test control inputs 216 to predict corresponding test outputs 220 for the next time step. The processor 202A calculates the cost function for each of the test control inputs 216 for the corresponding test outputs 220 and the reference signal 210. The examples of the cost functions are described above with reference to FIG. 2B.

At block 708, the processor 202A is further configured to select an optimum test control input from the test control inputs 216 based on an optimization of the cost function associated with the test control inputs 216 and the test outputs 220. Hence, the selected optimum test control input optimizes the cost function and is selected as the actuator command output 214 for the next time step. The processor 202A further determines a control command based on the selected optimal test control input. The control command may be transmitted to the air-conditioning system 102 for changing a speed of the compressor 404, an opening or closing of the expansion valve 604, changing a speed of the condenser fan 602 and/or changing a speed of the evaporator fan 606, and the like.

Figure 7B:
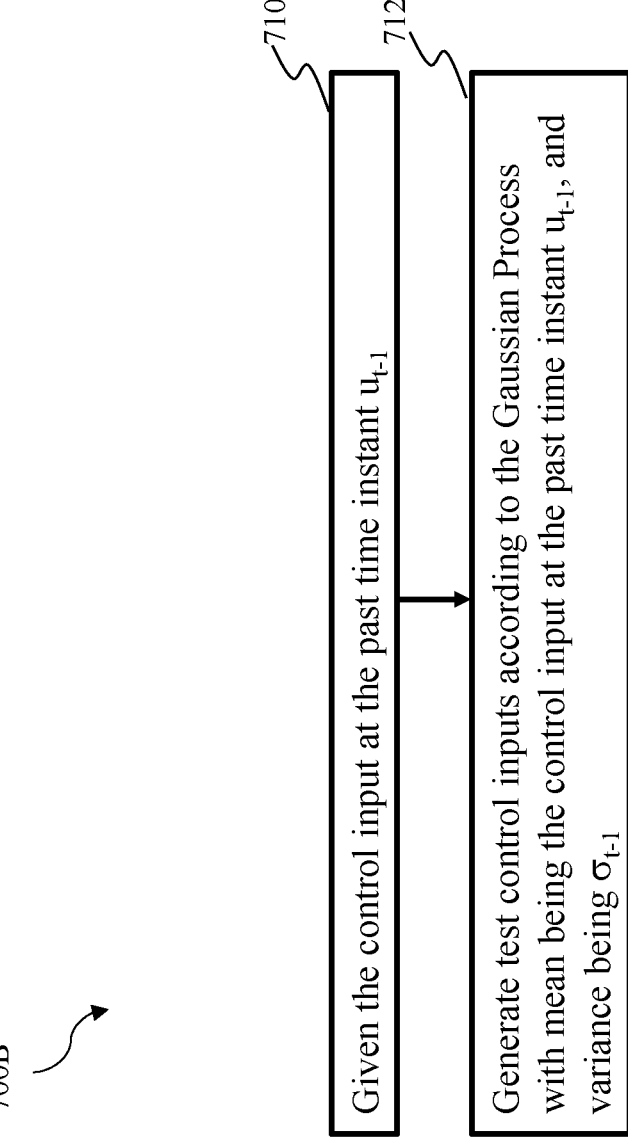
FIG. 7B illustrates a flowchart depicting generation of the plurality of test control inputs, according to some embodiments of the present disclosure.

FIG. 7B illustrates a flowchart 700B depicting generation of the test control inputs 216, according to an embodiment of the present disclosure. The test control inputs 216 are generated based on one-step optimization based control.

Initially, the control system 202 may consider a uniform distribution of test control inputs, since there is no information available about the test control inputs from the previous time step. These uniform test control inputs are sent to the system model 204. The processor 202A is configured to perform simulations to evaluate each one of these uniform test control inputs. The control input that minimizes the cost function is chosen as the actuator command 214 at the first time step. The processor 202A further utilizes one or more test control inputs of a previous time instant to generate the plurality of test control inputs 216 based on the Gaussian Process for a next time instant. To that end, at block 710, the control system 202 collects the test control inputs from the previous time step. At block 712, the processor 202A is configured to generate the test control inputs 216 at the current time step based on the test control inputs of the previous time step. The processor 202A may generate the test control inputs 216 based on the Gaussian Process of FIG. 7A. To that end, a mean and a variance in the Gaussian Process is computed. For example, the generated test control inputs 216 should have the mean to be the control input at the previous time step, while the variance can be determined as follows.

Given all the test control inputs at the previous time step, the corresponding predicted outputs are available because they are the outputs based on execution of the model 204 at the previous time step.

Calculate the mean and variance of all the predicted outputs at the previous time step and discard the outputs that are outside two standard deviations from their mean and keep the remaining outputs.

Calculate the variance $\sigma_{t-1}$ of the test control inputs 216 that correspond to the predicted outputs kept in Step (2).

$\sigma_{t-1}$ is used for the variance of the Gaussian distribution to generate the test control inputs 216 at the current time step.

Figure 8:
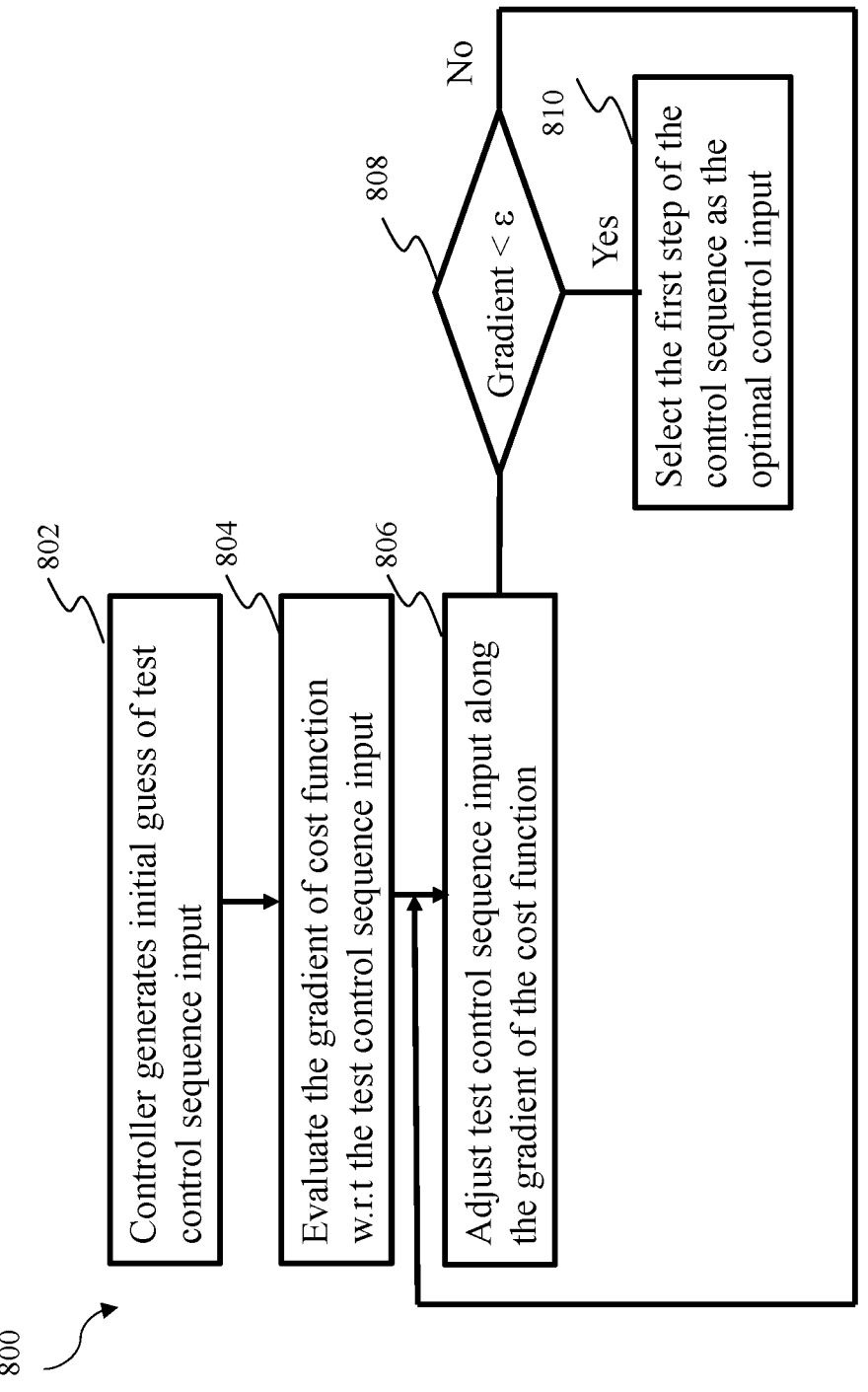
FIG. 8 illustrates a flowchart of an exemplar method for selection of the optimum test control input from a sequence of test control inputs based on a model predictive control process, according to some embodiments of the present disclosure.

FIG. 8 illustrates a flowchart 800 of an exemplary method for selection of the optimum test control input from a sequence of test control inputs based on a model predictive control process, according to another embodiment of the present disclosure. In this embodiment, the test control inputs 216 may be generated based on nonlinear Model Predictive Control. Different from the one-step optimization based control, gradient-based control evaluates the cost function over a finite time-horizon rather than at a time instant.

At block 802, the processor 202A generates an initial guess for a sequence of the test control inputs 216 corresponding to finite plurality of time instants. Next, at block 804, the processor 202A calculates the gradient of the cost function with respect to the sequence of the test control inputs 216 based on the predicted outputs 220 from the model 204. To that end, the sequence of test control inputs 216 is provided as an input to the model 204 and a sequence of test outputs 220 corresponding to the sequence of test control inputs 216 is predicted by the model 204. Further, the processor 202A calculates the gradient of the cost function with respect to the sequence of the test control inputs 216 using numerical differentiation. Since the model 204 is very computationally efficient, numerical differentiation does not impose significant overhead during this process. At block 806, the sequence of the test control inputs 216 is adjusted along the gradient of the cost function.

Further, the processor 202A selects an optimal test control input from the generated sequence of test control inputs 216 based on the calculated gradient of the cost function. To that end, at block 808, the processor 202A compares the gradient of the cost function with respect to the sequence of the test control inputs 216 with a predefined tolerance. Next, at block 810, if the gradient of the cost function associated with the sequence of the test control inputs 204 is smaller than the predefined tolerance, then the first step of the sequence of the test control inputs 216 is selected as an optimal control input. If the gradient of the cost function is larger than the predefined tolerance, then the process at block 806 is repeated until the entire process converges. The processor 202A executes the model 204 to predict test output based on the test control input and determines the control command to the air-conditioning system 102 based on the predicted test output of the model 204.

Figure 9:
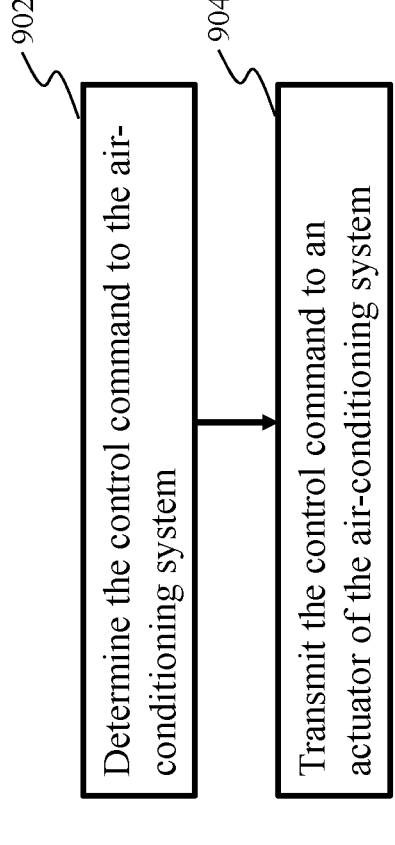
FIG. 9 illustrates a flowchart illustrating a method of determining the control command to the air-conditioning system, according to some embodiments of the present disclosure.

FIG. 9 illustrates a flowchart 900 illustrating a method of determining the control command to the air-conditioning system 102.

At block 902, the processor 202A determines the control command to the air-conditioning system 102 based on the predicted test output 222 of the simulation of the operation of the heat exchanger for the test control input 224. To that end, the model 204 predicts the test output 220 based on the predicted test output 222 of the neural network 208. With the predicted test output 220 of the model 204, the reference signal 210, and the corresponding measurement data 212, the processor 202A of the control system 202 generates the actuator command output 214. The processor 202A determines the control command to the air-conditioning system 102 based on the generated actuator command output 214. The examples of the control command have been described with respect to FIG. 7A.

At block 904, the processor 202A transmits the control command to an actuator such as the condenser fan control device 610, the compressor control device 612, the expansion valve control device 614, the evaporator fan control device 616, and the like of the air-conditioning system 102.

Figure 10:
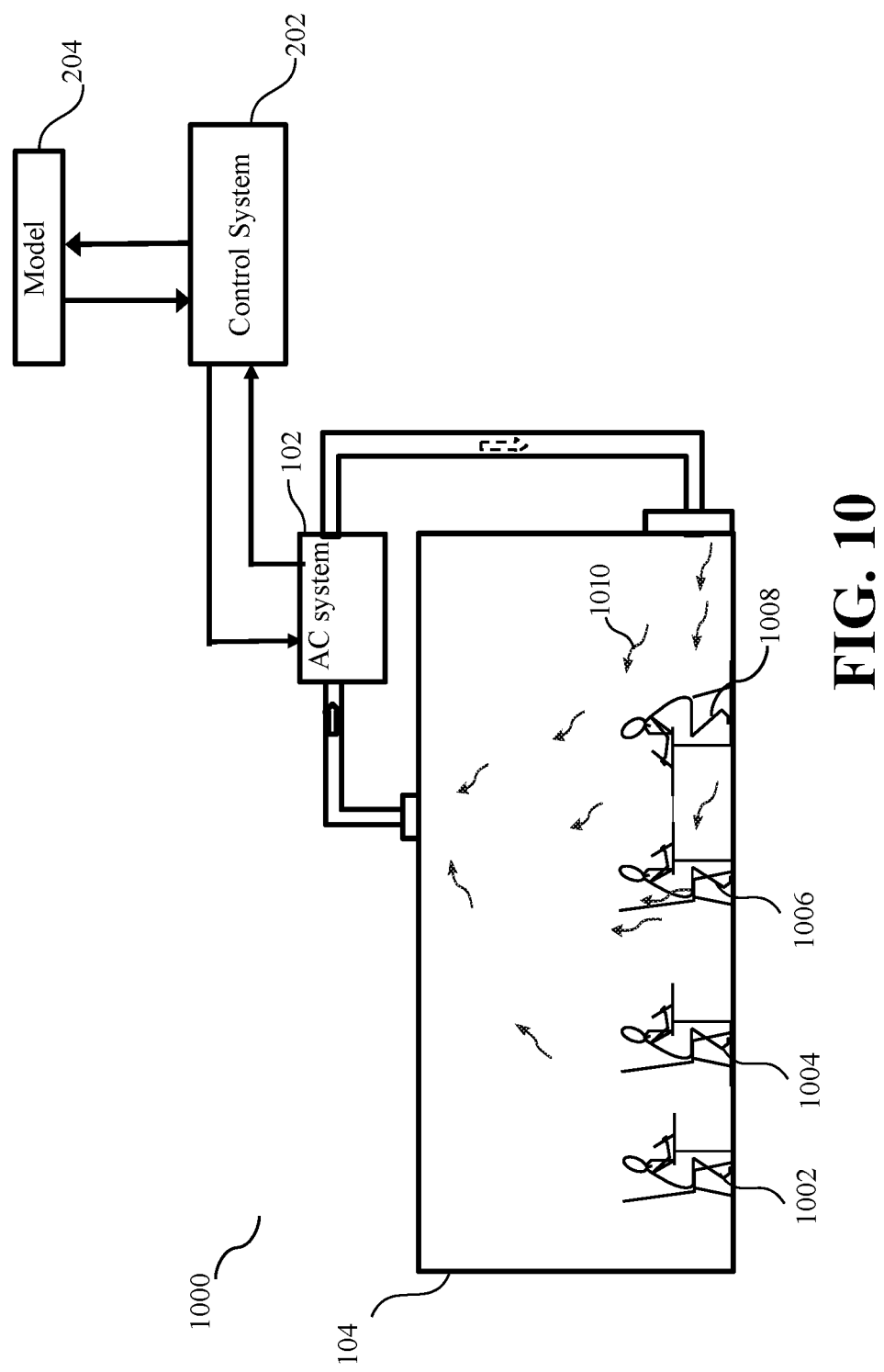
FIG. 10 illustrates a block diagram of a use case for controlling the air-conditioning system using the control system, according to some embodiments of the present disclosure.

FIG. 10 illustrates a block diagram 1000 for controlling the air-conditioning system 102 using the control system 202, according to an embodiment of the present disclosure.

The air-conditioning system 102 is arranged to the space 104. The space 104 is occupied by occupants 1002, 1004, 1006, and 1008. Arrows 1010 represent air supplied by the air-conditioning system 102 to the space 104. The control system 202 executes the model 204 to receive the test outputs 220.

Further, with the test outputs 220, the reference signal 210, and the measurement data 212 of the system 206, the control system 202 produces the control command 214 for the system 206. The control commands further controls the components of the air-conditioning system 102 in an optimum manner.

The above description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, if understood by one of ordinary skill in the art, the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Individual embodiments above are described as a process which is depicted as a flowchart, a flow diagram, a data flow diagram, a structure diagram, or a block diagram. Although a flowchart shows the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Many modifications and other embodiments of the disclosure set forth herein will come to mind to one skilled in the art to which these disclosure pertain having the benefit of the teachings presented in the foregoing descriptions and the associated drawings. It is to be understood that the disclosure are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A control system for controlling an operation of an air-conditioning system including a heat exchanger, comprising:

at least one non-transitory memory configured to store computer executable instructions; and at least one processor configured to execute the computer executable instructions to:

execute a neural network trained to simulate an operation of the heat exchanger for a test control input, to produce an output of the simulation based on historical data defining a state of the heat exchanger, the historical data including a sequence of historical control inputs provided to the heat exchanger and a sequence of historical outputs of the operation of the heat exchanger corresponding to the sequence of historical control inputs, wherein the neural network includes:

a first arm configured to:

process the test control input appended to the sequence of historical control inputs with a first combination of convolutional and recurrent networks trained to extract control features indicative of variation of the test control input from the historical control inputs;

a second arm configured to:

process the sequence of historical control inputs paired with the sequence of historical outputs with a second combination of convolutional and recurrent networks trained to extract output features indicative of dynamical coupling between inputs and corresponding outputs of the operation of the heat exchanger; and a third arm configured to process the control features and the output features to predict a test output of the operation of the heat exchanger corresponding to the test control input, wherein the third arm is a fully connected deep neural network accepting a tensor including the extracted control features and the extracted output features;

determine a control command to the air-conditioning system based on the predicted test output of the simulation of the operation of the heat exchanger for the test control input; and transmit the determined control command to an actuator of the air-conditioning system.

2. The control system of claim 1, wherein each of the first combination of the convolutional and recurrent networks of the first arm and the second combination of the convolutional and recurrent networks of the second arm of the neural network, includes a bank of one-dimensional convolutional layers followed by a gated recurrent unit.

3. The control system of claim 1, wherein the determined control command to the actuator of the air-conditioning system is associated with at least one of: a speed of a compressor, an opening or closing of a valve, or a speed of a fan of the air-conditioning system.

4. The control system of claim 1, wherein a first path of the first arm that processes the test control input appended to the sequence of historical control inputs is assigned a first neural weight and a second path of the second arm that processes the sequence of historical control inputs paired with the sequence of historical outputs is assigned a second neural weight.

5. The control system of claim 1, wherein the processor is further configured to:

generate one or more datasets associated with a trajectory of data obtained based on an execution of a physics-based model of the heat exchanger with one or more boundary conditions associated with the heat exchanger; and apply a machine learning algorithm on the generated datasets to train the neural network.

6. The control system of claim 5, wherein the processor is further configured to:

generate a plurality of batches of the trajectory of data to generate the one or more datasets, and wherein each batch of the plurality of batches comprises at least one of: the sequence of historical control inputs, the sequence of historical outputs, a first input to the air-conditioning system, and a true output of the air-conditioning system.

7. The control system of claim 6, wherein the process of training the neural network comprises:

computing a mean-squared error for each batch of the plurality of batches, based on a predicted output of the air-conditioning system and the true output of the air-conditioning system;

determining a training loss associated with the computed mean-squared error for each batch of the plurality of batches; and optimizing the determined training loss.

8. The control system of claim 1, wherein the processor is further configured to:

initialize a model associated with the air-conditioning system including a room model and a plurality of component models of the plurality of components of the air-conditioning system, wherein the plurality of component models includes at least the neural network trained to simulate the operation of the heat exchanger;

determine one or more conditions associated with at least an air side of a space associated with the air-conditioning system;

execute the room model and the plurality of component models of the plurality of components of the air-conditioning system based on the one or more conditions associated with at least an air side of the air-conditioning system; and generate one or more states associated with each of the room model and the plurality of component models, wherein the one or more states includes at least one of: a refrigerant state or an air state associated therewith.

9. The control system of claim 1, wherein the processor is further configured to:

generate a plurality of test control inputs based on a gaussian process;

provide, the plurality of test control inputs as an input, to a model of the air-conditioning system;

receive a plurality of test outputs corresponding to the plurality of test control inputs predicted by the model of the air-conditioning system;

select the test control input from the generated plurality of test control inputs based on an optimization of a cost function associated with the plurality of test control inputs and the plurality of test outputs; and determine the control command to the air-conditioning system based on the predicted test output of the simulation of the operation of the heat exchanger for the selected test control input.

10. The control system of claim 9, wherein the processor is further configured to utilize one or more test control inputs of a first time instant to generate the plurality of test control inputs based on the Gaussian Process for a second time instant, wherein the first time instant precedes the second time instant.

11. The control system of claim 1, wherein the processor is further configured to:

generate a sequence of test control inputs corresponding to a finite plurality of time instants;

provide, the sequence of test control inputs as an input, to a model of the air-conditioning system;

receive a sequence of test outputs corresponding to the sequence of test control inputs predicted by the model of the air-conditioning system;

calculate a gradient of a cost function associated with the sequence of test control inputs and the sequence of test outputs;

select the test control input from the generated sequence of test control inputs based on the calculated gradient of the cost function; and determine the control command to the air-conditioning system based on the predicted test output of the simulation of the operation of the heat exchanger for the selected test control input.

12. A method for controlling an operation of an air-conditioning system including a heat exchanger, comprising:

executing a neural network trained to simulate an operation of the heat exchanger for a test control input, to produce an output of the simulation based on historical data defining a state of the heat exchanger, the historical data includes a sequence of historical control inputs provided to the heat exchanger and a sequence of historical outputs of the operation of the heat exchanger corresponding to the sequence of historical control inputs, wherein the neural network includes:

a first arm configured to:

process the test control input appended to the sequence of historical control inputs with a first combination of convolutional and recurrent networks trained to extract control features indicative of variation of the test control input from the historical control inputs;

a second arm configured to:

process the sequence of historical control inputs paired with the sequence of historical outputs with a second combination of convolutional and recurrent networks trained to extract output features indicative of dynamical coupling between inputs and corresponding output of the operation of the heat exchanger; and a third arm configured to process the control features and the output features to predict a test output of the operation of the heat exchanger corresponding to the test control input, wherein the third arm is a fully connected deep neural network accepting a tensor including the extracted control features and the extracted output features;

determining a control command to the air-conditioning system based on the predicted test output of the simulation of the operation of the heat exchanger for the test control input; and transmitting the determined control command to an actuator of the air-conditioning system.

13. The method of claim 12, wherein each of the first combination of the convolutional and recurrent networks of the first arm and the second combination of convolutional and recurrent networks of the second arm of the neural network includes a bank of one-dimensional convolutional layers followed by a gated recurrent unit.

14. The method of claim 12, further comprising:

generating one or more datasets associated with a trajectory of data obtained based on an execution of a physics-based model with one or more boundary conditions associated with the heat exchanger; and applying a machine learning algorithm on the generated datasets to train the neural network.

15. The method of claim 14, further comprising:

generating a plurality of batches of the trajectory of data to generate the one or more datasets, wherein each batch of the plurality of batches comprises at least one of: the sequence of historical control inputs, the sequence of historical outputs, a first input to the air-conditioning system, and a true output of the air-conditioning system.

16. The method of claim 12, further comprising:

initializing a model associated with the air-conditioning system including a room model and a plurality of component models of the plurality of components of the air-conditioning system, wherein the plurality of component models includes at least the neural network trained to simulate the operation of the heat exchanger;

determining one or more conditions associated with at least an air side of the air-conditioning system;

executing the room model and the plurality of component models of the plurality of components of the air-conditioning system based on the one or more conditions associated with at least an air side of the air-conditioning system; and generating one or more states associated with each of the room model and the plurality of component models, wherein the one or more states includes at least one of: a refrigerant state or an air state associated therewith.

17. The method of claim 12, wherein the processor is further configured to:

generating a plurality of test control inputs based on a gaussian process;

providing, the plurality of test control inputs as an input, to a model of the air-conditioning system;

receiving a plurality of test outputs corresponding to the plurality of test control inputs predicted by the model of the air-conditioning system;

selecting the test control input from the generated plurality of test control inputs based on an optimization of a cost function associated with the plurality of test control inputs and the plurality of test outputs; and determining the control command to the air-conditioning system based on the predicted test output of the simulation of the operation of the heat exchanger for the selected test control input.

18. A non-transitory computer-readable medium having stored thereon computer-executable instructions, which when executed by a computer, cause the computer to execute operations, the operations comprising:

executing a neural network trained to simulate an operation of the heat exchanger for a test control input, to produce an output of the simulation based on historical data defining a state of the heat exchanger, the historical data includes a sequence of historical control inputs provided to the heat exchanger and a sequence of historical outputs of the operation of the heat exchanger corresponding to the sequence of historical control inputs, wherein the neural network includes:

a first arm configured to:

process the test control input appended to the sequence of historical control inputs with a first combination of convolutional and recurrent networks trained to extract control features indicative of variation of the test control input from the historical control inputs;

a second arm configured to:

process the sequence of historical control inputs paired with the sequence of historical outputs with a second combination of convolutional and recurrent networks trained to extract output features indicative of dynamical coupling between inputs and corresponding output of the operation of the heat exchanger; and a third arm configured to process the control features and the output features to predict a test output of the operation of the heat exchanger corresponding to the test control input, wherein the third arm is a fully connected deep neural network accepting a tensor including the extracted control features and the extracted output features;

determining a control command to the air-conditioning system based on the predicted test output of the simulation of the operation of the heat exchanger for the test control input; and transmitting the determined control command to an actuator of the air-conditioning system.

* * * * *